(12) United States Patent
Vesterinen et al.

(10) Patent No.: US 11,272,413 B2
(45) Date of Patent: Mar. 8, 2022

(54) ASSISTED DISTRIBUTED GATEWAY SELECTION

(71) Applicant: NOKIA SOLUTIONS AND NETWORKS OY, Espoo (FI)

(72) Inventors: Seppo Ilmari Vesterinen, Oulunsalo (FI); Matti Einari Laitila, Oulu (FI); Gyorgy Tamas Wolfner, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/307,598

(22) PCT Filed: Jun. 6, 2016

(86) PCT No.: PCT/EP2016/062793
§ 371 (c)(1),
(2) Date: Dec. 6, 2018

(87) PCT Pub. No.: WO2017/211381
PCT Pub. Date: Dec. 14, 2017

(65) Prior Publication Data
US 2019/0306770 A1 Oct. 3, 2019

(51) Int. Cl.
*H04W 36/12* (2009.01)
*H04W 8/24* (2009.01)
(Continued)

(52) U.S. Cl.
CPC ........... *H04W 36/12* (2013.01); *H04W 8/24* (2013.01); *H04W 40/34* (2013.01); *H04W 84/00* (2013.01)

(58) Field of Classification Search
CPC ....... H04W 36/12; H04W 8/24; H04W 40/34; H04W 84/00
(Continued)

(56) References Cited

U.S. PATENT DOCUMENTS

| 2007/0070888 A1* | 3/2007 | Raman | ................ | H04L 12/5692 |
| | | | | 370/229 |
| 2012/0314689 A1* | 12/2012 | Wang | .................... | H04W 36/12 |
| | | | | 370/331 |
| 2014/0078968 A1* | 3/2014 | Korhonen | ............... | H04L 69/28 |
| | | | | 370/328 |

FOREIGN PATENT DOCUMENTS

EP 2 981 133 A1 2/2016
EP 3 054 738 A1 8/2016
(Continued)

OTHER PUBLICATIONS

International Search Report and Written Opinion dated Feb. 28, 2017 corresponding to International Patent Application No. PCT/EP2016/062793.
(Continued)

*Primary Examiner* — Yemane Mesfin
*Assistant Examiner* — Intekhaab A Siddiquee
(74) *Attorney, Agent, or Firm* — Squire Patton Boggs (US) LLP

(57) ABSTRACT

There are provided measures for assisted distributed gateway selection. Such measures exemplarily comprise (as control plane network entity functionality in a mobile network scenario where an access of a terminal to a network is movable between at least two base stations and routable in parallel via at least one local gateway and a centralized gateway) detecting movement of said access of said terminal from a first base station to a second base station, determining that a first network route which is a current network route from said terminal via a first local gateway which is a current local gateway of said at least one local gateway provides less network performance than a second network route from said terminal via a second local gateway of said at least one local gateway based on a result of said detecting, and deciding
(Continued)

said second local gateway as a target local gateway for said terminal based on a result of said determining.

17 Claims, 16 Drawing Sheets

(51) Int. Cl.
*H04W 40/34* (2009.01)
*H04W 84/00* (2009.01)

(58) Field of Classification Search
USPC .......................................................... 370/331
See application file for complete search history.

(56) References Cited

FOREIGN PATENT DOCUMENTS

| EP | 3 062 583 A1 | 8/2016 | |
| EP | 3062583 A1 * | 8/2016 | ............ H04W 36/12 |
| WO | WO-2011096781 A2 * | 8/2011 | ........ H04W 36/0005 |
| WO | WO 2015/062065 A1 | 5/2015 | |
| WO | WO 2015/123945 A1 | 8/2015 | |

OTHER PUBLICATIONS

Huawei, "Connection management for SIPTO macro mobility," TD S2-103492, 3GPP TSG SA WG2 Meeting #80, Aug. 30, 2010, pp. 1-3, XP002665092.
Sep. 17, 2019 Communication pursuant to Article 94(3) EPC issued in European Patent Application No. 16730291.8.

* cited by examiner

ASSISTED DISTRIBUTED GATEWAY SELECTION

FIELD

The present invention relates to assisted distributed gateway selection. More specifically, the present invention exemplarily relates to measures (including methods, apparatuses and computer program products) for realizing assisted distributed gateway selection.

BACKGROUND

In the $3^{rd}$ Generation Partnership Project (3GPP) next generation (NG) mobile communications system (5G), user plane (U-plane) functions can be distributed close to the user equipment (UE)/NG radio access network (RAN) in order to serve increasing traffic and minimize the latency of the services.

The distributed U-plane deployment may cause inefficient data paths and long latency while the UE may move frequently out of the optimal service area of a gateway (GW) and while the UE is still kept anchored at the original GW in order to maintain internet protocol (IP) session continuity.

In this scenario, the U-plane paths need to be optimized by selecting a new GW through which the UE has an optimal data path in its new location, while providing a seamless mechanism to deprecate the IP sessions via the original GW and to initiate new IP sessions via the new GW/IP anchor.

The following key issues are to be resolved to enable (re)selection of efficient user plane paths, and thus, underlie the present invention. Namely, on the one hand, reselection of a U-plane path between a UE attached to the mobile network and communication peers outside of the mobile network (e.g. internet hosts) when the previous path becomes inefficient is desirable. Further, on the other hand, minimizing impact to the user experience (e.g. minimization of interruption time and loss of packets) when changing the anchoring point for some or all packet data connections of a UE is desirable as well.

In the next generation system, separation of control plane (C-plane) and U-plane will be required. Therefore, simple U-plane gateways could be located in a distributed manner to support different scenarios or service requirements.

FIG. 11 is a schematic diagram illustrating a possible architecture of a scenario in which U-Plane GWs are located in a distributed manner (distributed GWs). As shown in FIG. 11, a distributed gateway scenario is introduced to make the U-plane path efficient considering variant requirement of services. There are two types of GWs deployed in distributed manner.

As a first type, a local GW (L-GW) is arranged in an edge data network (edge DN). The L-GW is located close to the edge of the network, i.e., in the local area network, close the RAN or co-located in the NG node B (NGNB), if needed. This is applicable for services which require an efficient data path with low latency and optimal routing e.g. mobile edge computing (MEC), vehicle-to-vehicle (V×V, V2V), etc., or is to be used for offloading data traffic from the core network (CN), e.g. internet, access.

As a second type, a GW is arranged in the central part of the network. The centralized GW is located in a centralized way to provide connection for supporting applications which require service continuity (e.g. IP multimedia subsystem (IMS)).

In FIG. 11, the upper double-headed arrow represents an IP session 1, i.e., an IP session via L-GW. Further, the lower double-headed arrow represents an IP session 2, i.e., an IP session via the centralized GW.

The NG network provides support for a UE to access services via multiple GWs and having allocated IP addresses from each of these GWs at a time. The data traffic from/to the specific IP address shall pass through its associated GW and UE's current serving NGNB.

The challenge in the NG networks is to define a mobility concept that provides IP service/session continuation by using distributed IP gateways in which context frequent GW changes become unavoidable. Here, it should be noticed that both 3GPP general packet radio service (GPRS) tunneling protocol (GTP) and internet engineering task force (IETF) mobile IP based mobility are basing on a centralized GW model, i.e., are not designed to support new low latency services in NG access which necessitate support of optimal routing and local switching in order to minimize end to end (e-2-e) latency on the data path.

Although according to Long Term Evolution (LTE) agreements a GW can be placed close to the UEs (e.g. local IP access (LIPA)/selected IP traffic offload (SIPTO) features), a GW relocation mechanism without service/IP session break (due to that IP addresses cannot be preserved) is not available. Further, also the current 3GPP link model necessitates a UE to establish multiple packet data network (PDN) connections in order to access simultaneously services from a local and a centralized GW. Here, it is noted that not all UEs provide support for multiple PDNs as the management of multiple PDNs is difficult both for the UE and the network side.

According to the specifications in 3G/4G networks, accessing two service networks, e.g. a local service network and central service network, each with its own gateway, by using only a single PDN connection, is not possible. It would only be possible by setting up two simultaneous PDN connections, each to one gateway, which has the disadvantage of becoming visible to the UE, its operating system and application software.

In the above-discussed scenario, when a UE moves, the current L-GW at the edge network may no more provide optimal routing and low latency (may no more provide optimal/good network performance) to access the services in this data network.

If a GW relocation is enabled in the access point name (APN), the GW could be relocated to provide an efficient user plane path. The control plane function evaluates and determines whether the user plane should be updated, e.g., based on UE location, APN and supported services.

A typical approach for a network controlled GW (U-plane anchor) change by using a single PDN connection that requires disconnecting the current PDN connection prior to establishing a (new) PDN connection via the new GW. As this approach cannot preserve the IP address for the ongoing IP sessions these must be terminated i.e. IP session continuation cannot be supported.

An improved approach may be using multiple PDU sessions to the same data network, or using a multi-homed PDU session, which both enable continuing the current IP sessions via old L-GW while a moved UE has obtained IP connectivity to a new L-GW with assistance of the network.

A multi-homed PDU session may be defined as follows. Namely, when IPv6 is used, a PDU session may be associated with one or multiple IPv6 prefixes. The latter case is referred to as multi-homed PDU session. In this case the PDU Session provides access to the data network via two separate IP anchors. The two user plane paths leading to the IP anchors branch out of a common U-Plane-GW that is configured with a common "default IP router" functionality as defined in IETF RFC 7157 "IPv6 Multihoming without Network Address Translation". The "default IP router" functionality can also be collocated with the RAN. The multi-homed PDU session may be used to support make-before-break service continuity or cases where UE needs to access both a local service (e.g. MEC server) and the internet.

A seamless GW change with "make-before-break service continuity" can be utilized with IPv6 PDU sessions as follows.

FIG. 12 is a schematic diagram illustrating an approach for seamless GW change for efficient user plane selection. In FIG. 12, the upper double-headed arrow represents a local IP session 1, i.e., an IP session via L-GW 1. Further, the middle double-headed arrow represents a local IP session 2, i.e., an IP session via L-GW 2, in particular a local IP session issued later due to movement of the UE. Finally, the lower double-headed arrow represents a central IP session, i.e., an IP session via the centralized GW.

Namely, when a UE is handed over to a new NGNB, then the data path from the current GW is switched as usual in order to continue the current IP sessions without any breaks. However, if a UE has a service with a multi-homed PDU session, or with capability for multiple PDU Sessions, the control plane function in the network may detect that the current GW is no more optimal and may initiate data path setup in the new serving NGNB to provide IPv6 connectivity to a new U-plane GW on the U-plane for the UE.

Further, when IPv6 connectivity to a new GW is added by using multiple PDU sessions to the same data network, or by using a multi-homed PDU session, UE configures a set of IPv6 addresses from the new GW, and the UE adds the new GW address into its default router list. Here, the UE has temporarily multiple default routers and it is up to the router-and-source address selection rules which guide UE to use new GW and IPv6 addresses with Prefix2 for the new IP sessions, and to continue existing IP sessions via the old GW with its preserved IPv6 addresses.

Finally, with respect to seamless GW change, connectivity to the old GW can be released safely after the existing IPv6 sessions through it become closed.

When detected, the network may assist the UE to delete the old GW from its default router list and releases connectivity to the old GW.

When the IPv6 protocol stack in the UE has multiple default routers in its destination cache, the router-and-source address selection rules shall guide which default router and source address will be used for the newly established IP sessions (sockets). However, these selection rules are not well defined in the IETF, so that it remains dependent on the implementation how a UE can know which IP address to use for packet routing and which IP address maps to which application/service.

The IETF specification RFC 4191 "Default Router selection and more specific routes" describes an optional extension to ND router advertisement (RA) messages for communicating default router preferences and more-specific routes from routers to hosts. The supported preference values are High, Medium (default) and Low. This improves the ability of hosts to pick an appropriate router for an off-link destination. The support for RFC 4191 is implemented in all the UEs having multi-homing capable IPv6 stacks. Several mainstream operating systems (OS) already implement RFC 4191, including Linux, BSD variants, and Microsoft Windows, starting from XP. The interface(s) accepting an RFC 4191 extension can typically be specified just by using host side (UE) configuration.

However, the RFC 4191 requires that the preference values and specific routes advertised to hosts from the routers (uGWs) require explicit administrative/manual configuration by the network operator, i.e., they are not automatically derived from routing tables. Moreover, in context of the NG network, the routers should be configurable with granularity of a host (UE) that cannot be handled just with administrative configurations.

Hence, the problem, how the network can control a UE to move the routing from the old uGW to a new uGW which provides a more optimal routing (higher performance) while a UE has multiple default routers available in its destination cache, arises.

Hence, there is a need to provide for assisted distributed gateway selection.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a control plane network entity in a mobile network scenario where an access of a terminal to a network is movable between at least two base stations and routable in parallel via at least one local gateway and a centralized gateway, the method comprising detecting movement of said access of said terminal from a first base station to a second base station, determining that a first network route which is a current network route from said terminal via a first local gateway which is a current local gateway of said at least one local gateway provides less network performance than a second network route from said terminal via a second local gateway of said at least one local gateway based on a result of said detecting, and deciding said second local gateway as a target local gateway for said terminal based on a result of said determining.

According to an exemplary aspect of the present invention, there is provided a method in a mobile network scenario where an access of a terminal to a network is movable between at least two base stations and routable in parallel via at least one local gateway and a centralized gateway, the method of a first local gateway of said at least one local gateway comprising receiving, if a second local gateway is decided as a target local gateway by a control plane network entity, information from said control plane network entity, said information being indicative of a new preference value related to a session between said first local gateway and said terminal which is lower than a current preference value related to said session between said first local gateway and said terminal, and transmitting, to said terminal, a message including said new preference value.

According to an exemplary aspect of the present invention, there is provided a method in a mobile network scenario where an access of a terminal to a network is movable between at least two base stations and routable in parallel via at least one local gateway and a centralized gateway, the method of a first local gateway of said at least one local gateway comprising detecting movement of said access of said terminal from a first base station to a second base station, determining that a first network route which is a current network route from said terminal via said first local gateway which is a current local gateway of said at least one local gateway provides less network performance than a second network route from said terminal via a second local gateway of said at least one local gateway based on a result of said detecting, deciding a new preference value related to a session between said first local gateway and said terminal which is lower than a current preference value related to said session between said first local gateway and said terminal, and transmitting, to said terminal, a message including said new preference value.

According to an exemplary aspect of the present invention, there is provided a method in a mobile network scenario where an access of a terminal to a network is movable between at least two base stations and routable in parallel via at least one local gateway and a centralized gateway, wherein, when a current local gateway is a first local gateway of said at least one local gateway, the method of a second local gateway of said at least one local gateway comprising receiving, if said second local gateway is decided as a target local gateway by a control plane network entity, information from said control plane network entity, said information being indicative of a preference value related to a session between said second local gateway and said terminal which is equal to or higher than a preference value related to a session between said first local gateway and said terminal, and transmitting, to said terminal, a message including said preference value related to said session between said second local gateway and said terminal.

According to an exemplary aspect of the present invention, there is provided an apparatus providing control plane network entity functionality in a mobile network scenario where an access of a terminal to a network is movable between at least two base stations and routable in parallel via at least one local gateway and a centralized gateway, the apparatus comprising at least one processor, at least one memory including computer program code, and at least one interface configured for communication with at least another apparatus, the at least one processor, with the at least one memory and the computer program code, being configured to cause the apparatus to perform detecting movement of said access of said terminal from a first base station to a second base station, determining that a first network route which is a current network route from said terminal via a first local gateway which is a current local gateway of said at least one local gateway provides less network performance than a second network route from said terminal via a second local gateway of said at least one local gateway based on a result of said detecting, and deciding said second local gateway as a target local gateway for said terminal based on a result of said determining.

According to an exemplary aspect of the present invention, there is provided an apparatus providing first local gateway functionality in a mobile network scenario where an access of a terminal to a network is movable between at least two base stations and routable in parallel via at least one local gateway and a centralized gateway, the apparatus comprising at least one processor, at least one memory including computer program code, and at least one interface configured for communication with at least another apparatus, the at least one processor, with the at least one memory and the computer program code, being configured to cause the apparatus to perform receiving, if a second local gateway is decided as a target local gateway by a control plane network entity, information from said control plane network entity, said information being indicative of a new preference value related to a session between said first local gateway and said terminal which is lower than a current preference value related to said session between said first local gateway and said terminal, and transmitting, to said terminal, a message including said new preference value.

According to an exemplary aspect of the present invention, there is provided an apparatus providing first local gateway functionality in a mobile network scenario where an access of a terminal to a network is movable between at least two base stations and routable in parallel via at least one local gateway and a centralized gateway, the apparatus comprising at least one processor, at least one memory including computer program code, and at least one interface configured for communication with at least another apparatus, the at least one processor, with the at least one memory and the computer program code, being configured to cause the apparatus to perform detecting movement of said access of said terminal from a first base station to a second base station, determining that a first network route which is a current network route from said terminal via said first local gateway which is a current local gateway of said at least one local gateway provides less network performance than a second network route from said terminal via a second local gateway of said at least one local gateway based on a result of said detecting, deciding a new preference value related to a session between said first local gateway and said terminal which is lower than a current preference value related to said session between said first local gateway and said terminal, and transmitting, to said terminal, a message including said new preference value.

According to an exemplary aspect of the present invention, there is provided an apparatus in a mobile network scenario where an access of a terminal to a network is movable between at least two base stations and routable in parallel via at least one local gateway and a centralized gateway, wherein, when a current local gateway is a first local gateway of said at least one local gateway, the apparatus providing second local gateway functionality comprising at least one processor, at least one memory including computer program code, and at least one interface configured for communication with at least another apparatus, the at least one processor, with the at least one memory and the computer program code, being configured to cause the apparatus to perform receiving, if said second local gateway is decided as a target local gateway by a control plane network entity, information from said control plane network entity, said information being indicative of a preference value related to a session between said second local gateway and said terminal which is equal to or higher than a preference value related to a session between said first local gateway and said terminal, and transmitting, to said terminal, a message including said preference value related to said session between said second local gateway and said terminal.

According to an exemplary aspect of the present invention, there is provided an apparatus providing control plane network entity functionality in a mobile network scenario where an access of a terminal to a network is movable between at least two base stations and routable in parallel via at least one local gateway and a centralized gateway, the apparatus comprising detecting circuitry configured to detect movement of said access of said terminal from a first base station to a second base station, determining circuitry configured to determine that a first network route which is a current network route from said terminal via a first local gateway which is a current local gateway of said at least one local gateway provides less network performance than a second network route from said terminal via a second local gateway of said at least one local gateway based on a result of said detecting, and deciding circuitry configured to decide said second local gateway as a target local gateway for said terminal based on a result of said determining.

According to an exemplary aspect of the present invention, there is provided an apparatus providing first local gateway functionality in a mobile network scenario where an access of a terminal to a network is movable between at least two base stations and routable in parallel via at least one local gateway and a centralized gateway, the apparatus comprising receiving circuitry configured to receive, if a second local gateway is decided as a target local gateway by a control plane network entity, information from said control plane network entity, said information being indicative of a new preference value related to a session between said first local gateway and said terminal which is lower than a current preference value related to said session between said first local gateway and said terminal, and transmitting circuitry configured to transmit, to said terminal, a message including said new preference value.

According to an exemplary aspect of the present invention, there is provided an apparatus providing first local gateway functionality in a mobile network scenario where an access of a terminal to a network is movable between at least two base stations and routable in parallel via at least one local gateway and a centralized gateway, the apparatus comprising detecting circuitry configured to detect movement of said access of said terminal from a first base station to a second base station, determining circuitry configured to determine that a first network route which is a current network route from said terminal via said first local gateway which is a current local gateway of said at least one local gateway provides less network performance than a second network route from said terminal via a second local gateway of said at least one local gateway based on a result of said detecting, deciding circuitry configured to decide a new preference value related to a session between said first local gateway and said terminal which is lower than a current preference value related to said session between said first local gateway and said terminal, and transmitting circuitry configured to transmit, to said terminal, a message including said new preference value.

According to an exemplary aspect of the present invention, there is provided an apparatus in a mobile network scenario where an access of a terminal to a network is movable between at least two base stations and routable in parallel via at least one local gateway and a centralized gateway, wherein, when a current local gateway is a first local gateway of said at least one local gateway, the apparatus providing second local gateway functionality comprising receiving circuitry configured to receive, if said second local gateway is decided as a target local gateway by a control plane network entity, information from said control plane network entity, said information being indicative of a preference value related to a session between said second local gateway and said terminal which is equal to or higher than a preference value related to a session between said first local gateway and said terminal, and transmitting circuitry configured to transmit, to said terminal, a message including said preference value related to said session between said second local gateway and said terminal.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient data path transporting while keeping IP session continuity to thereby solve at least part of the problems and drawbacks identified in relation to the prior art.

By way of exemplary embodiments of the present invention, there is provided assisted distributed gateway selection. More specifically, by way of exemplary embodiments of the present invention, there are provided measures and mechanisms for realizing assisted distributed gateway selection.

Thus, improvement is achieved by methods, apparatuses and computer program products enabling/realizing assisted distributed gateway selection.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
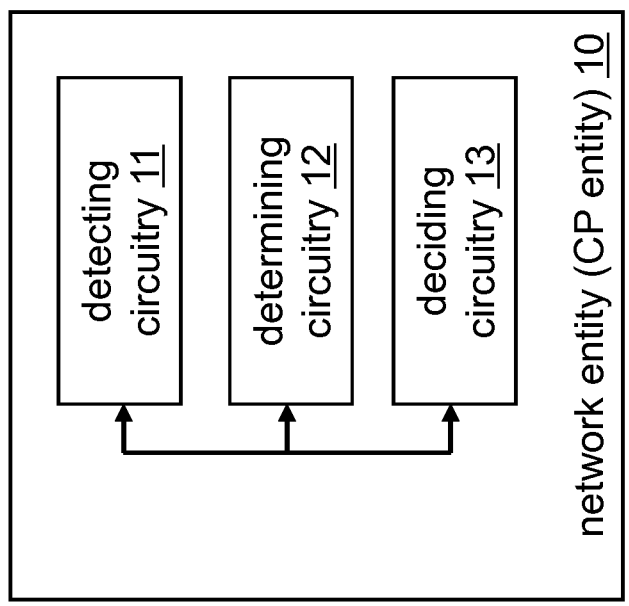
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) assisted distributed gateway selection.

The following concepts and requirements underlie the present invention. In particular, there is a need for an efficient U-plane with a seamless mobility support to be considered for the NG system. In this context, depending on the service, a UE with assistance of the NG network shall be capable to select its optimal IP point of attachment(s)/default GW(s) at the time to provide a replacement for the traditional centralized mobility anchoring paradigm. Further, the emphasis shall be on introducing a NG session continuation with a seamless GW change that is basing on full utilization of IPv6 protocol over NG radio and access network. Furthermore, from the UE IP stack/OS point of view, the NG link model is necessarily fully IPv6 compliant. Finally, the general objective may be seen in enhancing NG mobility management to meet the primary goals in mobile network evolution towards smooth network convergence, i.e., improving scalability, avoiding single points of failure, and enabling smooth interworking between NG access and fixed access networks.

For exemplary embodiments of the present invention, it is assumed that a UE has a multi-homed IPv6 connectivity to the NG network either with multiple PDU sessions, or with a multi-homed PDU session. The former corresponds scenario 3 "Multiple Uplink, Multiple Next Hop, Multiple Prefix" in IETF specification RFC 7157, while the latter corresponds to either scenario 1 "Single Uplink, Multiple Next Hop, Multiple Prefix", or scenario 2 "Single Uplink, Single Next Hop, Multiple Prefix", depending on the used link model.

Figure 12:
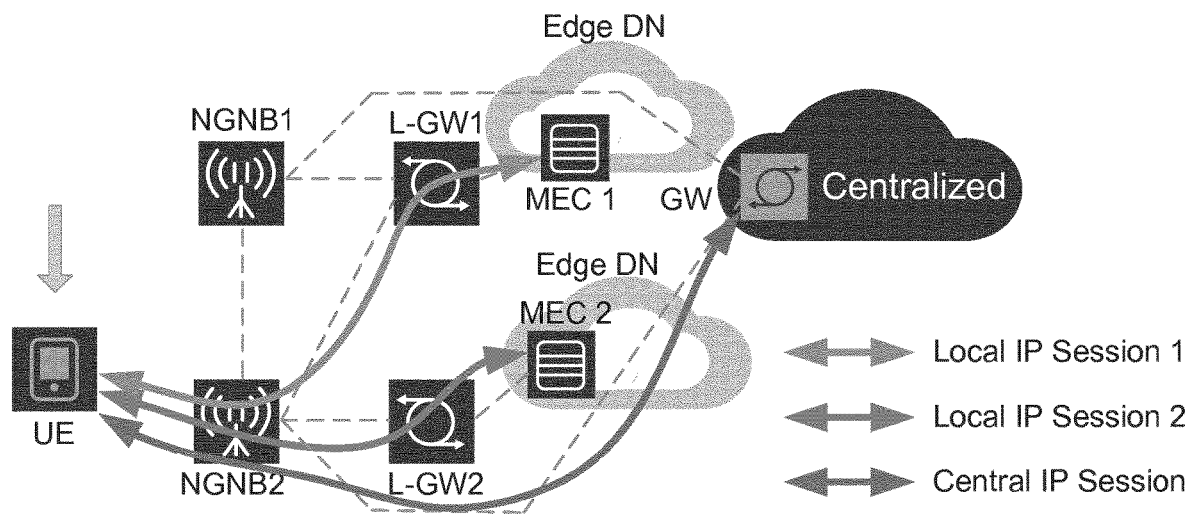
FIG. 12 is a schematic diagram illustrating an approach for seamless GW change for efficient user plane selection.

Moreover, for exemplary embodiments of the present invention, a mobility scenario shown in FIG. 12 is assumed, in which, as discussed above, a UE has obtained multi-homed IPv6 connectivity via two L-GWs. Namely, the old L-GW1 and a new L-GW2 which connectivity is added to the UE with assistance of the network in order to provide more optimal routing. According to exemplary embodiments of the present invention, the NG network can control a multi-homed UE in its route selection to the operator/network preferred route, when multiple IP addresses are assigned from multiple next-hop routers (at least two).

In order to make the uGWs routers in a NG network to send ND RAs with (supported) preference values specified in RFC 4191, it is assumed for exemplary embodiments of the present invention that the uGWs routers are specific mobility routers which have a C-plane interface to the session and mobility management (SM, MM) functions in the NG network.

Summarized, according to exemplary embodiments of the present invention, the uGWs routers will be NG Core network controllable entities, and session/mobility management functions of the NG network can manage connectivity for a multi-homed IPv6 Link/service flow specific tunnel from the NGNBs to the uGW(s), i.e., NG network is capable to dynamically perform the required explicit administrative configurations in the uGWs routers.

In order to operate it is required that NG mobile terminals (i.e., UEs) should be C type hosts according to RFC 4191.

When a new L-uGW router is added to a multi-homed IPv6 PDU session, or as a new IPv6 PDU session due to a mobility event, according to exemplary embodiments, this happens in control of the NG network based on UE's new location, topology and service awareness.

For exemplary embodiments of the present invention, it is assumed that in a mobility event the newest L-uGW router that is connected to a UE after a handover shall provide the most optimal route (see FIG. 12, with the UE moving "down") for a multi-homed UE. According to exemplary embodiments of the present invention, the NG network control functions are aware of the network topology and the preferred routes. Hence, according to exemplary embodiments of the present invention, in a mobility event, the NG network control functions configure the new L-uGW regarding the RA preference value of its UE uGW context data to be sent as a UE specific RA to an associated PDU session with higher or at least with the same preference value than what is advertised in the old L-uGW which is used for the current IP sessions at the application layer.

As the NG network control functions are aware of the network topology, and based on this information it can be determined that the old L-uGW router is no more the most optimal router (regarding network performance) for a UE, according to exemplary embodiments of the present invention, this router is configured in a mobility event to send preference value "Low" in a UE specific RA in its associated PDU session.

Here, according to exemplary embodiments of the present invention, at least two options are possible.

Namely, on the one hand, the NG network control functions configure the RA preference value in the UE L-uGW context data to send the desired value in a UE specific PDU session.

Further, on the other hand, the L-uGWs may be pre-configured with network topology information based on which it can detect how each NGNB in their service coverage area can provide user plane connectivity for the UEs. This topology information may consist of a NGNB identifier, NGNM IP address (however, less adequate if in different IP sub-net), or some proper parameter indicating the route quality related with a requirement for low latency and optimal routing (i.e., network performance). In a mobility event, the old L-uGW with non-optimal route may start to send autonomously UE specific RA to a PDU session with preference value "Low" in order to direct UE in its newly established IP sessions to use the possible new L-uGW with better route on the data path. Further, a notification message about a changed PDU session data can be sent to the SM and MM functions in order to keep the NG core up-to-date. Accordingly, it is not necessitated that the uGWs routers are aware of their neighboring uGWs routers.

According to further exemplary embodiments of the present invention, later a UE with a multi-homed IPv6 connectivity may eventually terminate its ongoing IP sessions using non-optimal old L-uGW which advertises "Low" preference value. According to these exemplary embodiments, an uGW advertising low preference value shall monitor and detect when these ongoing IP session(s) in a UE specific PDU session become terminated. Upon detection of this termination, L-uGW may send a "Delete PDU Session Request" message to the NG network control functions. When receiving a "Delete Session Response" message with "accept", the L-uGW shall send to a UE specific PDU session RAs with L-uGW router's lifetime set to zero. In this way the UE becomes deprecated from its IPv6 connectivity via a non-optimal L-uGW in a managed manner.

In case that a UE still initiates (tries to initiate) new IP sessions via a non-optimal L-uGW, according to exemplary embodiments of the present invention, the NG network control functions may configure such L-uGW router to send a redirect message to a host, telling it to use a different (i.e., another) router for a specific destination.

In this regard, it is noted that the redirect functionality is limited to a single link (above-mentioned scenarios 1 and 2 in RFC 7157) as it issues the link local IPv6 address of the preferred router from which a host should resolve a link layer address (LLA) of the router by using ND. Thus, a router on one link cannot redirect a host to a router on another link. Hence, redirect messages do not help a multi-homed (through multiple interfaces in above-mentioned scenario 3 in RFC 7157) host in selecting an appropriate router in case of multiple PDU sessions in the NG network as each PDU session is modeled as a different interface/link.

Exemplary embodiments of the present invention are in the following described in more general terms.

Figure 7:
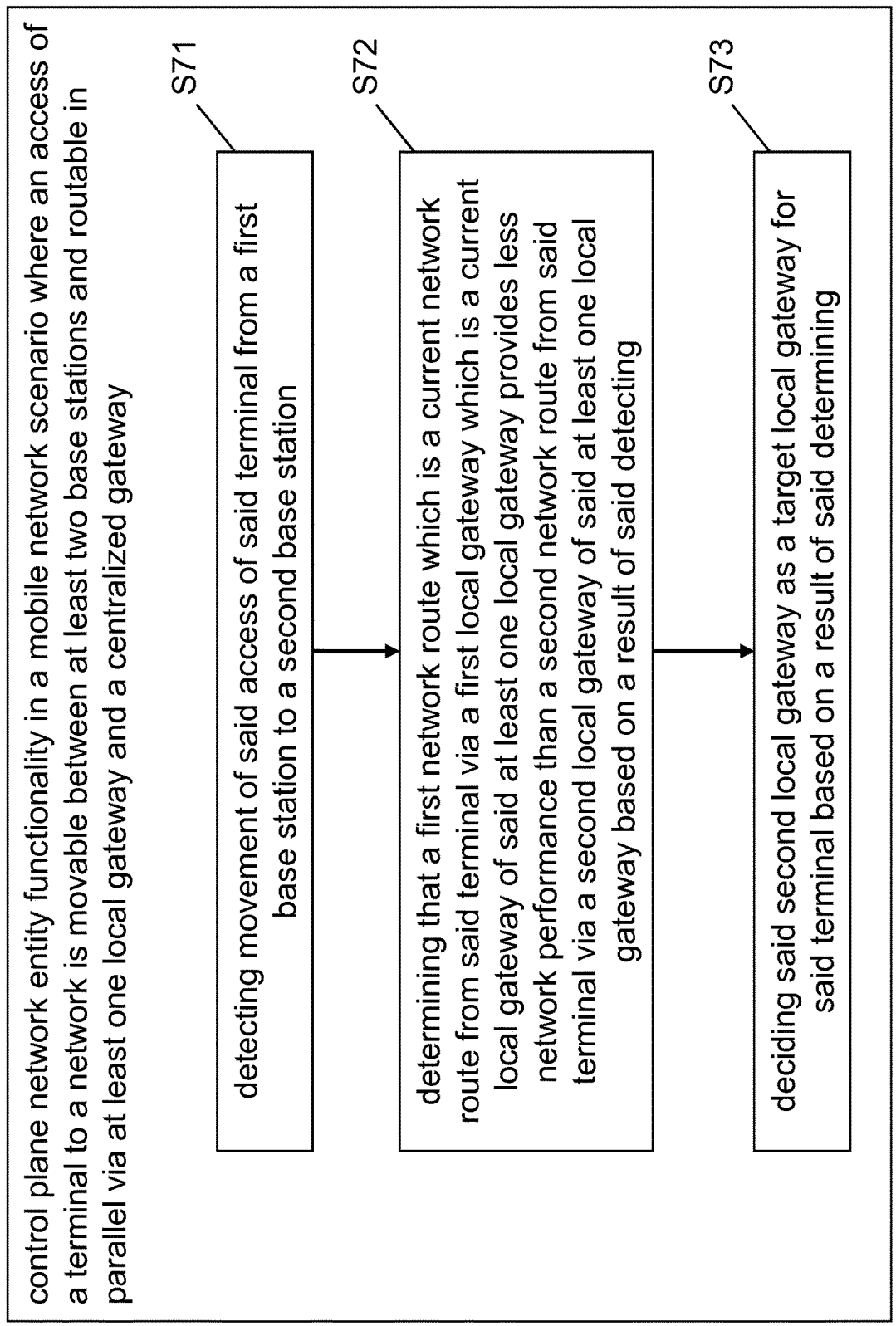
FIG. 7 is a schematic diagram of a procedure according to exemplary embodiments of the present invention.

FIG. 1 is a block diagram illustrating an apparatus according to exemplary embodiments of the present invention. The apparatus may be a network entity 10 (in a mobile network scenario where an access of a terminal to a network is movable between at least two base stations and routable in parallel via at least one local gateway and a centralized gateway) such as a control plane entity (NG network control functions) comprising detecting circuitry 11, determining circuitry 12, and deciding circuitry 13. The detecting circuitry 11 detects movement of said access of said terminal from a first base station to a second base station. The determining circuitry 12 determines that a first network route which is a current network route from said terminal via a first local gateway which is a current local gateway of said at least one local gateway provides less network performance than a second network route from said terminal via a second local gateway of said at least one local gateway based on a result of said detecting circuitry 11. In this context, the second local gateway does (at that time) not correspond to the current local gateway. The deciding circuitry 13 decides said second local gateway as a target local gateway for said terminal based on a result of said determining circuitry 12. FIG. 7 is a schematic diagram of a procedure according to exemplary embodiments of the present invention. The apparatus according to FIG. 1 may perform the method of FIG. 7 but is not limited to this method. The method of FIG. 7 may be performed by the apparatus of FIG. 1 but is not limited to being performed by this apparatus.

As shown in FIG. 7, a procedure according to exemplary embodiments of the present invention comprises an operation of detecting (S71) movement of said access of said terminal from a first base station to a second base station, an operation of determining (S72) that a first network route which is a current network route from said terminal via a first local gateway which is a current local gateway of said at least one local gateway provides less network performance than a second network route from said terminal via a second local gateway of said at least one local gateway based on a result of said detecting, and an operation of deciding (S73) said second local gateway as a target local gateway for said terminal based on a result of said determining.

Figure 2:
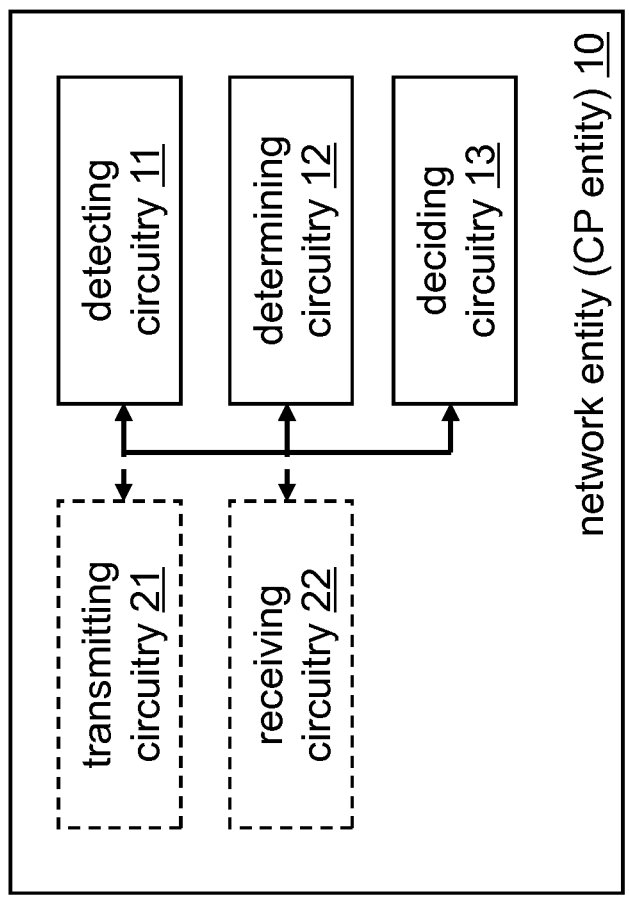
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise transmitting circuitry 21 and receiving circuitry 22.

In an embodiment at least some of the functionalities of the apparatus shown in FIG. 1 may be shared between two or more physically separate devices forming one operational entity. Therefore, the apparatus may be seen to depict the operational entity comprising one or more physically separate devices for executing at least some of the described processes.

According to a variation of the procedure shown in FIG. 7, exemplary additional operations are given, which are inherently independent from each other as such. According to such variation, an exemplary method according to exemplary embodiments of the present invention may comprise an operation of transmitting, if said second local gateway is decided as said target local gateway, information to said second local gateway, said information being indicative of a preference value related to a session between said second local gateway and said terminal which is equal to or higher than a preference value related to a session between said first local gateway and said terminal.

According to a variation of the procedure shown in FIG. 7, exemplary additional operations are given, which are inherently independent from each other as such. According to such variation, an exemplary method according to exemplary embodiments of the present invention may comprise an operation of transmitting, if said second local gateway is decided as said target local gateway, information to said first local gateway, said information being indicative of a new preference value related to a session between said first local gateway and said terminal which is lower than a current preference value related to said session between said first local gateway and said terminal.

According to exemplary embodiments of the present invention, said preference value is selected from a group comprising high, medium, and low.

According to further exemplary embodiments of the present invention, said preference value is a terminal local gateway context data router advertisement preference value.

According to a variation of the procedure shown in FIG. 7, exemplary details of the determining operation (S72) are given, which are inherently independent from each other as such.

Such exemplary determining operation (S72) according to exemplary embodiments of the present invention may be based on a network topology with respect to said at least two base stations and said at least one local gateway.

According to a variation of the procedure shown in FIG. 7, exemplary additional operations are given, which are inherently independent from each other as such. According to such variation, an exemplary method according to exemplary embodiments of the present invention may comprise an operation of transmitting, to said first local gateway, configuration information configuring said first local gateway to redirect new session attempts from said terminal.

According to a variation of the procedure shown in FIG. 7, exemplary additional operations are given, which are inherently independent from each other as such. According to such variation, an exemplary method according to exemplary embodiments of the present invention may comprise an operation of receiving, from said first local gateway, a message indicative of a request regarding a removal of said first network route from said terminal, and an operation of transmitting, to said first local gateway, a message indicative of acceptance regarding said removal of said first network route from said terminal.

Figure 3:
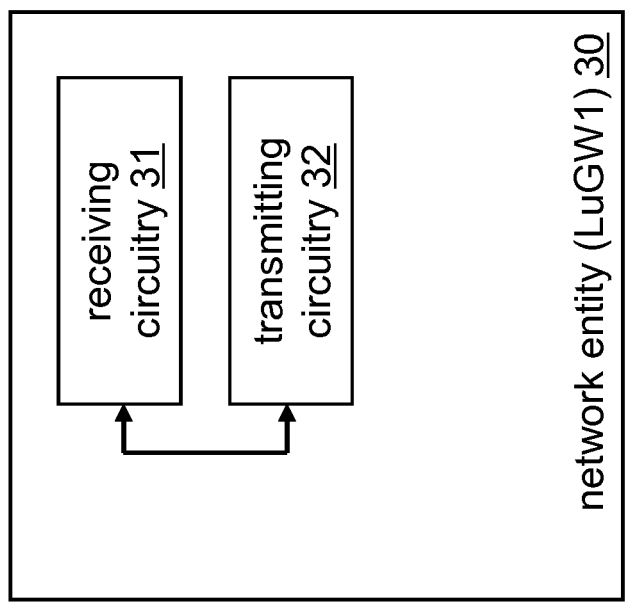
FIG. 3 is a block diagram illustrating an apparatus according to exemplary embodiments of the present invention.
Figure 8:
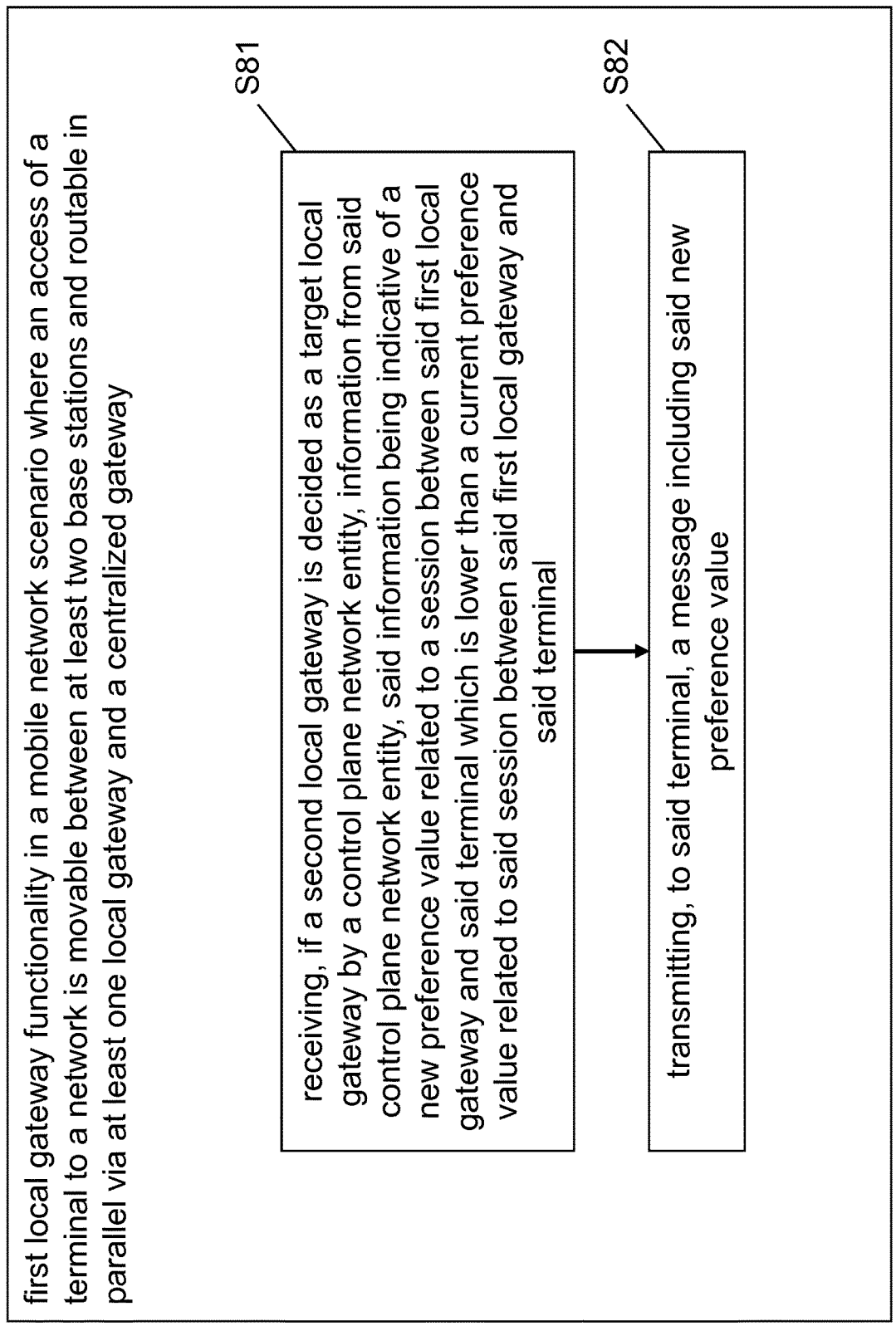
FIG. 8 is a schematic diagram of a procedure according to exemplary embodiments of the present invention.

FIG. 3 is a block diagram illustrating an apparatus according to exemplary embodiments of the present invention. The apparatus may be a network entity 30 (a first local gateway of said at least one local gateway in a mobile network scenario where an access of a terminal to a network is movable between at least two base stations and routable in parallel via said at least one local gateway and a centralized gateway) such as a local uGW (LuGW1, i.e. "old" L-uGW) comprising receiving circuitry 31 and transmitting circuitry 32. The receiving circuitry 31 receives, if a second local gateway is decided as a target local gateway by a control plane network entity, information from said control plane network entity, said information being indicative of a new preference value related to a session between said first local gateway and said terminal which is lower than a current preference value related to said session between said first local gateway and said terminal. The transmitting circuitry 32 transmits, to said terminal, a message including said new preference value. FIG. 8 is a schematic diagram of a procedure according to exemplary embodiments of the present invention. The apparatus according to FIG. 3 may perform the method of FIG. 8 but is not limited to this method. The method of FIG. 8 may be performed by the apparatus of FIG. 3 but is not limited to being performed by this apparatus.

As shown in FIG. 8, a procedure according to exemplary embodiments of the present invention comprises an operation of receiving (S81), if a second local gateway is decided as a target local gateway by a control plane network entity, information from said control plane network entity, said information being indicative of a new preference value related to a session between said first local gateway and said terminal which is lower than a current preference value related to said session between said first local gateway and said terminal, and an operation of transmitting (S82), to said terminal, a message including said new preference value.

In an embodiment at least some of the functionalities of the apparatus shown in FIG. 3 may be shared between two or more physically separate devices forming one operational entity. Therefore, the apparatus may be seen to depict the operational entity comprising one or more physically separate devices for executing at least some of the described processes.

Figure 4:
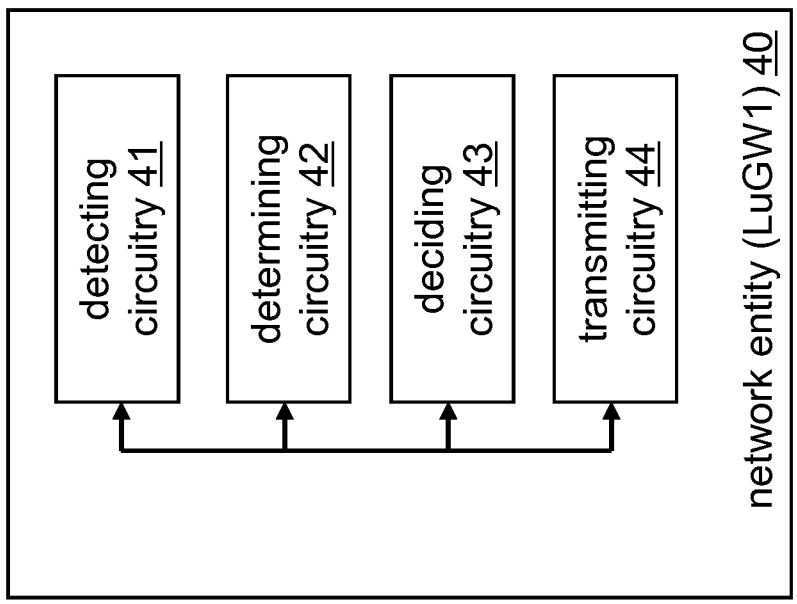
FIG. 4 is a block diagram illustrating an apparatus according to exemplary embodiments of the present invention.
Figure 9:
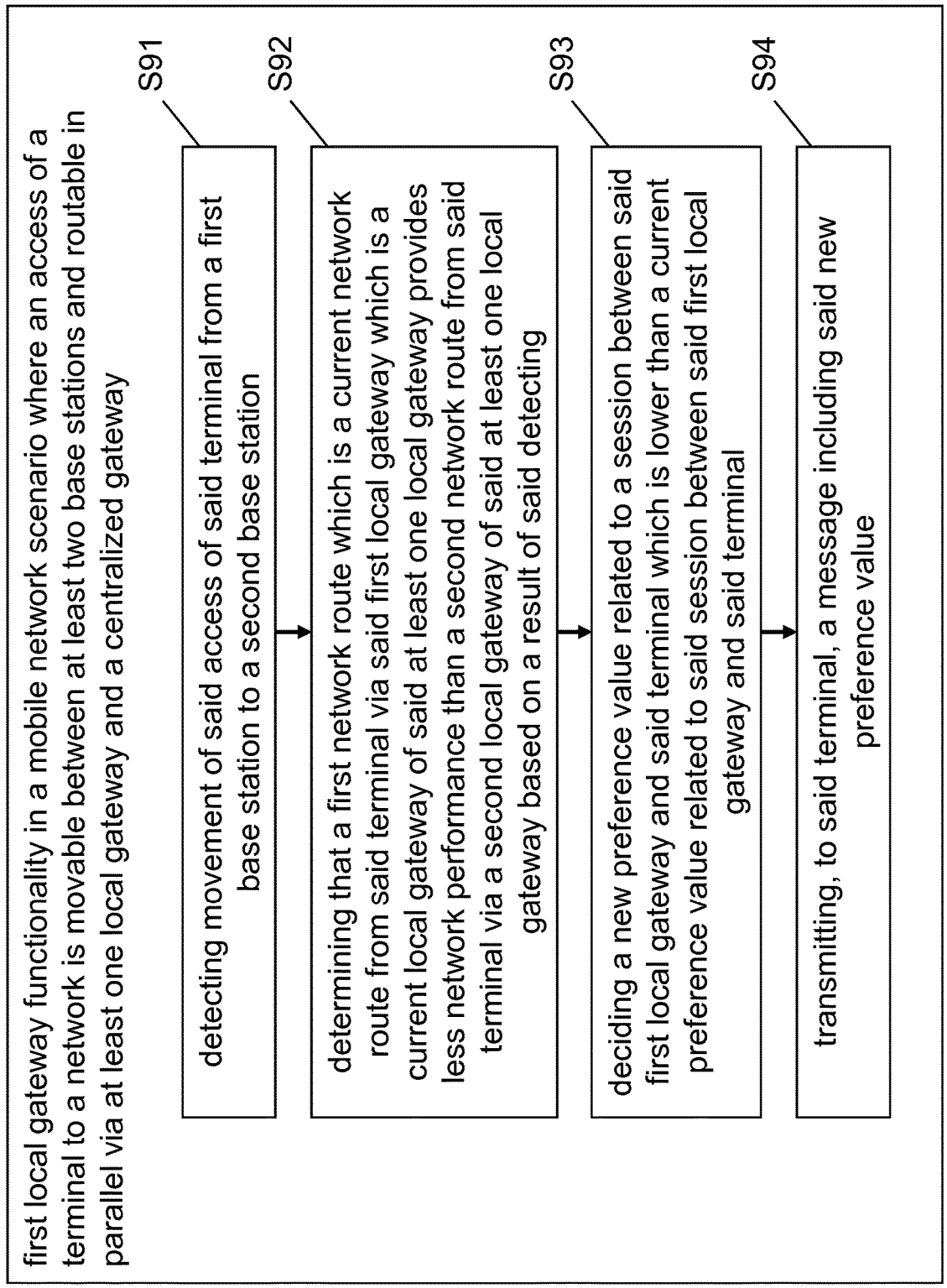
FIG. 9 is a schematic diagram of a procedure according to exemplary embodiments of the present invention.

FIG. 4 is a block diagram illustrating an apparatus according to exemplary embodiments of the present invention. The apparatus may be a network entity 40 (a first local gateway of said at least one local gateway in a mobile network scenario where an access of a terminal to a network is movable between at least two base stations and routable in parallel via said at least one local gateway and a centralized gateway) such as a local uGW (LuGW1, i.e. "old" L-uGW) comprising detecting circuitry 41, determining circuitry 42, deciding circuitry 43, and transmitting circuitry 44. The detecting circuitry 41 detects movement of said access of said terminal from a first base station to a second base station. The determining circuitry 42 determines that a first network route which is a current network route from said terminal via said first local gateway which is a current local gateway of said at least one local gateway provides less network performance than a second network route from said terminal via a second local gateway of said at least one local gateway based on a result of said detecting circuitry 41. In this context, the second local gateway does (at that time) not correspond to the current local gateway. The deciding circuitry 43 decides a new preference value related to a session between said first local gateway and said terminal which is lower than a current preference value related to said session between said first local gateway and said terminal. The transmitting circuitry 44 transmits, to said terminal, a message including said new preference value. FIG. 9 is a schematic diagram of a procedure according to exemplary embodiments of the present invention. The apparatus according to FIG. 4 may perform the method of FIG. 9 but is not limited to this method. The method of FIG. 9 may be performed by the apparatus of FIG. 4 but is not limited to being performed by this apparatus.

As shown in FIG. 9, a procedure according to exemplary embodiments of the present invention comprises an operation of detecting (S91) movement of said access of said terminal from a first base station to a second base station, an operation of determining (S92) that a first network route which is a current network route from said terminal via said first local gateway which is a current local gateway of said at least one local gateway provides less network performance than a second network route from said terminal via a second local gateway of said at least one local gateway based on a result of said detecting (S91), an operation of deciding (S93) a new preference value related to a session between said first local gateway and said terminal which is lower than a current preference value related to said session between said first local gateway and said terminal (based on a result of said determining (S92)), and an operation of transmitting (S94), to said terminal, a message including said new preference value.

Figure 5:
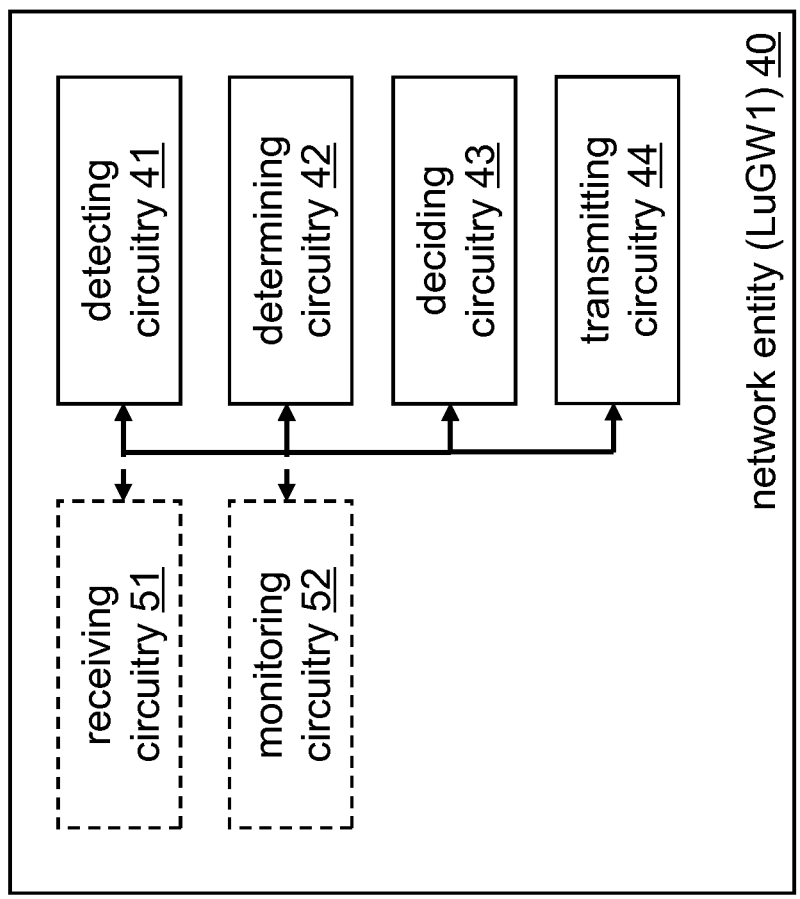
FIG. 5 is a block diagram illustrating an apparatus according to exemplary embodiments of the present invention.

FIG. 5 is a block diagram illustrating an apparatus according to exemplary embodiments of the present invention. In particular, FIG. 5 illustrates a variation of the apparatus shown in FIG. 4. The apparatus according to FIG. 5 may thus further comprise receiving circuitry 51 and monitoring circuitry 52.

In an embodiment at least some of the functionalities of the apparatus shown in FIG. 4 may be shared between two or more physically separate devices forming one operational entity. Therefore, the apparatus may be seen to depict the operational entity comprising one or more physically separate devices for executing at least some of the described processes.

According to a variation of the procedure shown in FIGS. 8 and/or 9, exemplary details of the determining operation (S92) are given, which are inherently independent from each other as such.

Such exemplary determining operation (S92) according to exemplary embodiments of the present invention may be based on a network topology with respect to said at least two base stations and said at least one local gateway.

According to exemplary embodiments of the present invention, said preference value is selected from a group comprising high, medium, and low.

According to further exemplary embodiments of the present invention, said preference value is a terminal local gateway context data router advertisement preference value.

According to a variation of the procedure shown in FIGS. 8 and/or 9, exemplary additional operations are given, which are inherently independent from each other as such. According to such variation, an exemplary method according to exemplary embodiments of the present invention may comprise an operation of receiving, from said control plane network element, configuration information configuring said first local gateway to redirect new session attempts from said terminal, an operation of receiving a new session attempt from said terminal, and an operation of transmitting a redirect message indicative of an instruction to attempt a local gateway which is not said first local gateway.

According to a variation of the procedure shown in FIGS. 8 and/or 9, exemplary additional operations are given, which are inherently independent from each other as such. According to such variation, an exemplary method according to exemplary embodiments of the present invention may comprise an operation of monitoring said session between said first local gateway and said terminal for termination thereof, and an operation of transmitting, upon detection of termination of said session between said first local gateway and said terminal as a result of said monitoring, to said control plane network entity, a message indicative of a request regarding a removal of said first network route from said terminal.

According to a variation of the procedure shown in FIGS. 8 and/or 9, exemplary additional operations are given, which are inherently independent from each other as such. According to such variation, an exemplary method according to exemplary embodiments of the present invention may comprise an operation of receiving, from said control plane network entity, a message indicative of acceptance regarding said removal of said first network route from said terminal, and an operation of transmitting, to said terminal, a message indicative of a lifetime of said first local gateway set to Zero.

According to exemplary embodiments of the present invention, said message indicative of said lifetime may comprise a terminal local gateway context data router advertisement.

Figure 6:
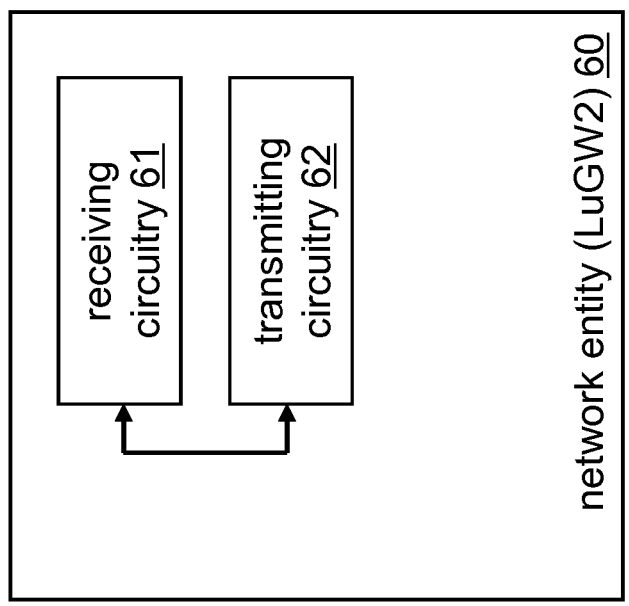
FIG. 6 is a block diagram illustrating an apparatus according to exemplary embodiments of the present invention.
Figure 10:
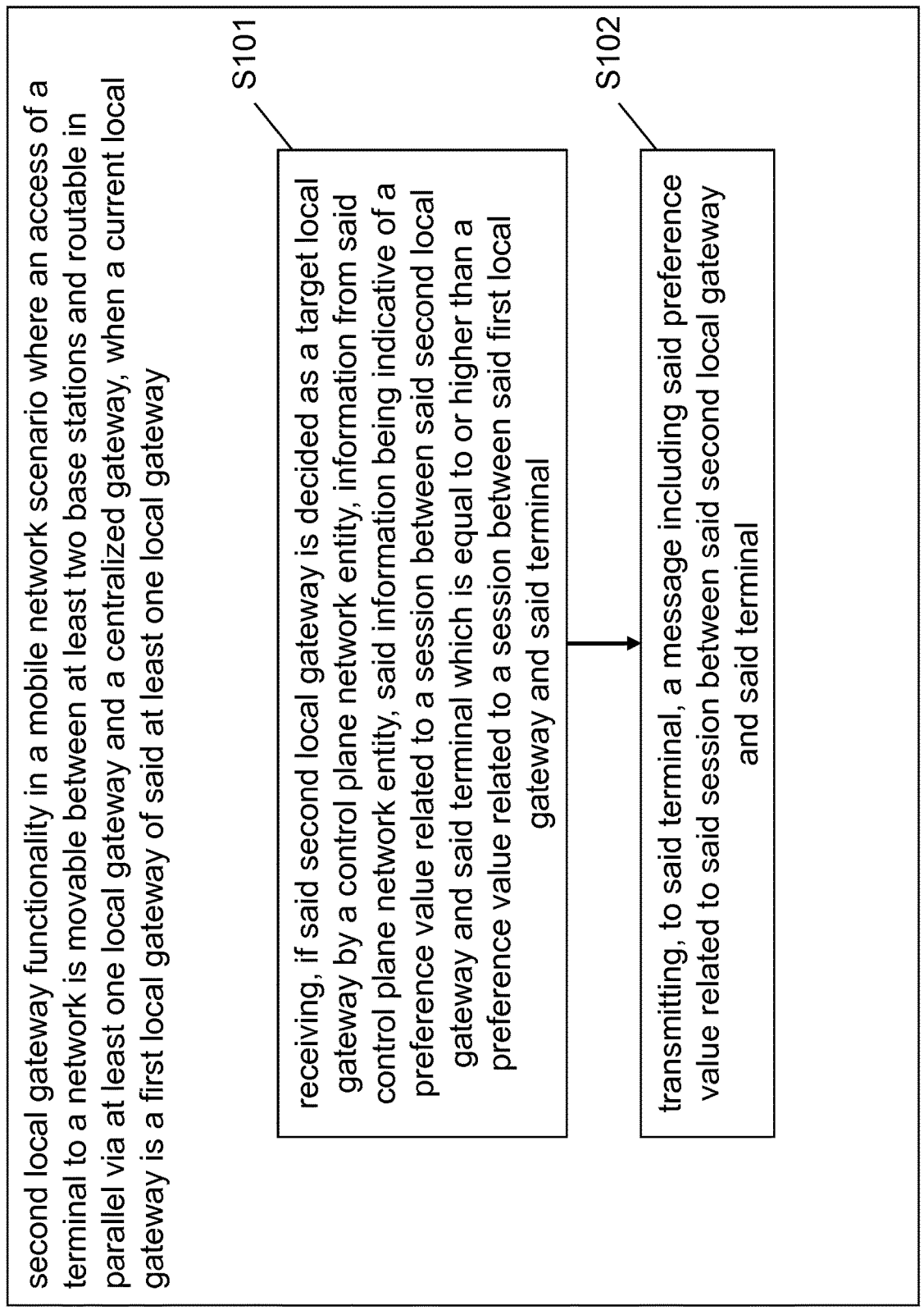
FIG. 10 is a schematic diagram of a procedure according to exemplary embodiments of the present invention.
Figure 11:
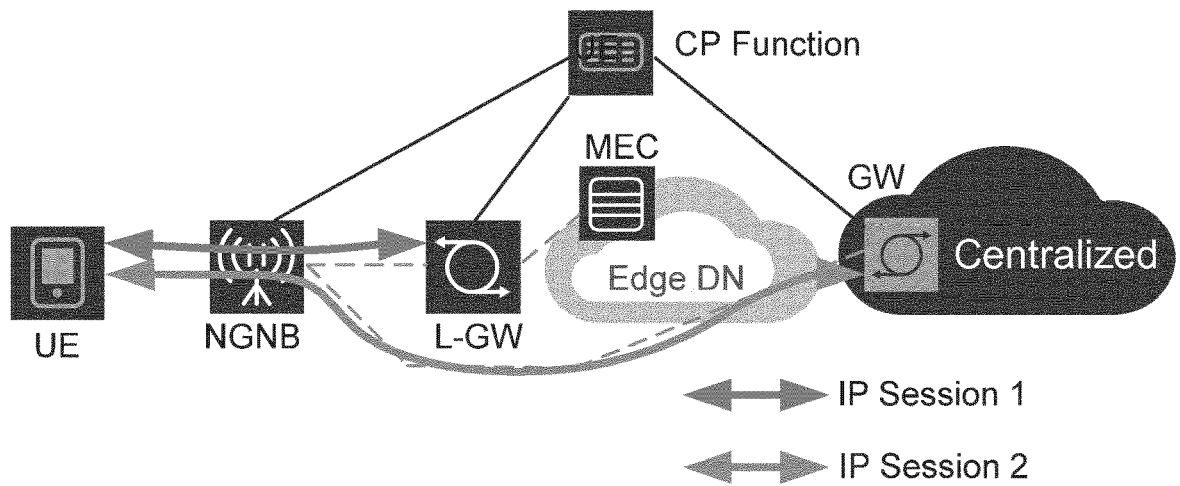
FIG. 11 is a schematic diagram illustrating a possible architecture of a scenario in which U-Plane GWs are located in a distributed manner (distributed GWs).

FIG. 6 is a block diagram illustrating an apparatus according to exemplary embodiments of the present invention. The apparatus may be a network entity 60 (a second local gateway of an at least one local gateway in a mobile network scenario where an access of a terminal to a network is movable between at least two base stations and routable in parallel via said at least one local gateway and a centralized gateway, wherein a current local gateway is a first local gateway of said at least one local gateway) such as a local uGW (LuGW2, i.e. "new" L-uGW) comprising receiving circuitry 61 and transmitting circuitry 62. The receiving circuitry 61 receives, if said second local gateway is decided as a target local gateway by a control plane network entity, information from said control plane network entity, said information being indicative of a preference value related to a session between said second local gateway and said terminal which is equal to or higher than a preference value related to a session between said first local gateway and said terminal. The transmitting circuitry 62 transmits, to said terminal, a message including said preference value related to said session between said second local gateway and said terminal. FIG. 10 is a schematic diagram of a procedure according to exemplary embodiments of the present invention. The apparatus according to FIG. 6 may perform the method of FIG. 10 but is not limited to this method. The method of FIG. 10 may be performed by the apparatus of FIG. 6 but is not limited to being performed by this apparatus.

As shown in FIG. 10, a procedure according to exemplary embodiments of the present invention comprises an operation of receiving (S101), if said second local gateway is decided as a target local gateway by a control plane network entity, information from said control plane network entity, said information being indicative of a preference value related to a session between said second local gateway and said terminal which is equal to or higher than a preference value related to a session between said first local gateway and said terminal, and an operation of transmitting (S102), to said terminal, a message including said preference value related to said session between said second local gateway and said terminal.

In an embodiment at least some of the functionalities of the apparatus shown in FIG. 6 may be shared between two or more physically separate devices forming one operational entity. Therefore, the apparatus may be seen to depict the operational entity comprising one or more physically separate devices for executing at least some of the described processes.

According to exemplary embodiments of the present invention in relation to the procedure shown in FIG. 10, said preference value is selected from a group comprising high, medium, and low.

According to further exemplary embodiments of the present invention, said preference value is a terminal local gateway context data router advertisement preference value.

Figure 13:
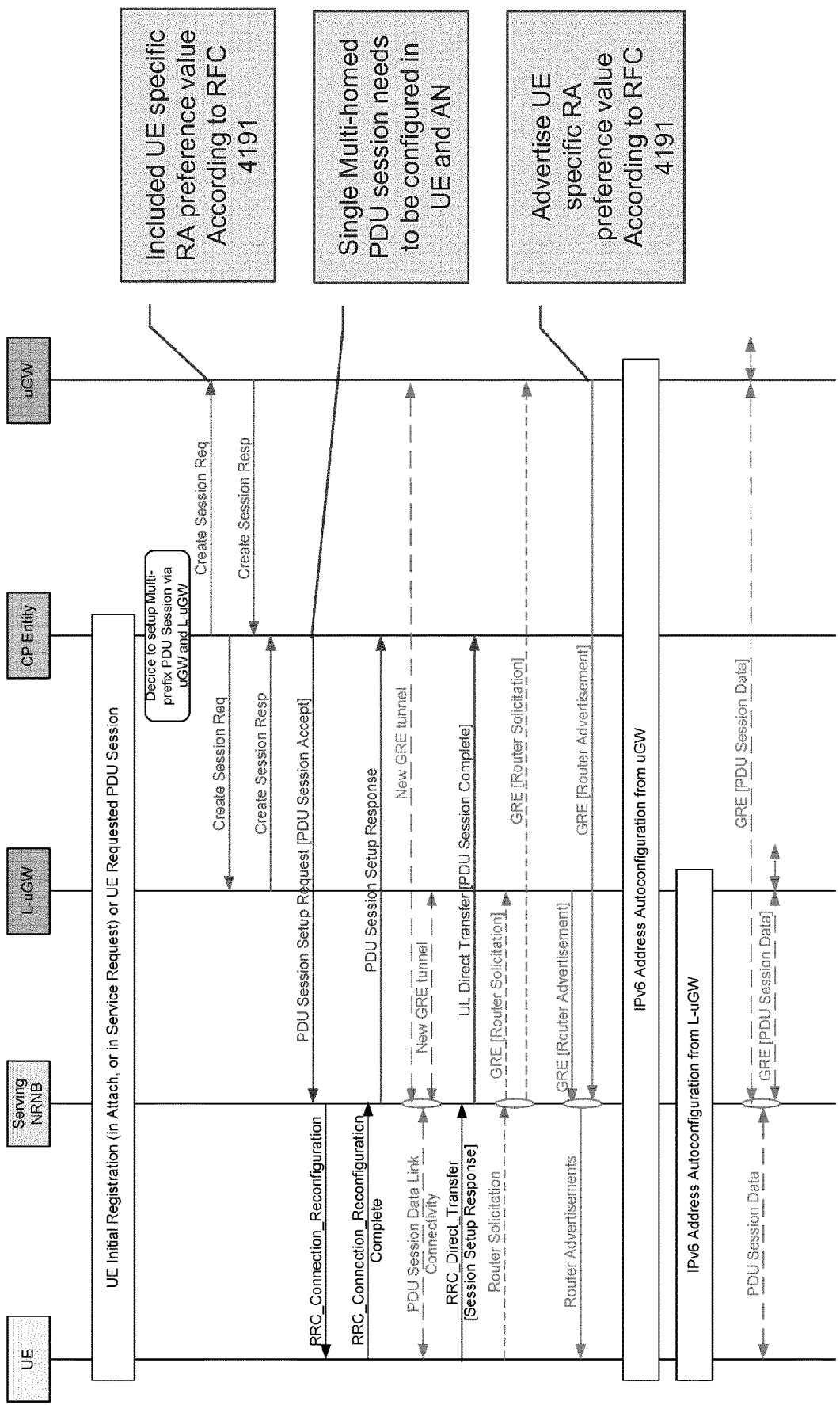
FIG. 13 shows a schematic diagram of an example of a system environment with signaling variants according to exemplary embodiments of the present invention.

FIG. 13 shows a schematic diagram of an example of a system environment with signaling variants according to exemplary embodiments of the present invention.

In particular, in relation to FIG. 13, exemplary embodiments of the present invention are described in more concrete terms.

Namely, in FIG. 13, a multi-homed PDU session setup procedure is illustrated, in which the network initiates multi-homed IPv6 connectivity via uGW (centralized) and an L-uGW (local).

As can be seen in FIG. 13, according to exemplary embodiments of the present invention, the control functions (CP Entity) configures UE specific preference values according to RFC 4191 into uGW and L-uGW in order to be delivered in the UE specific RA messages to the UE (under the assumption that the UE is connected with point-to-point (p-t-p) link model to each uGW, i.e., there are no other hosts connected in this link).

It is noted that it is up to operator's desire and supported services how to configure the preference values in the uGW and the L-uGW.

Figure 14:
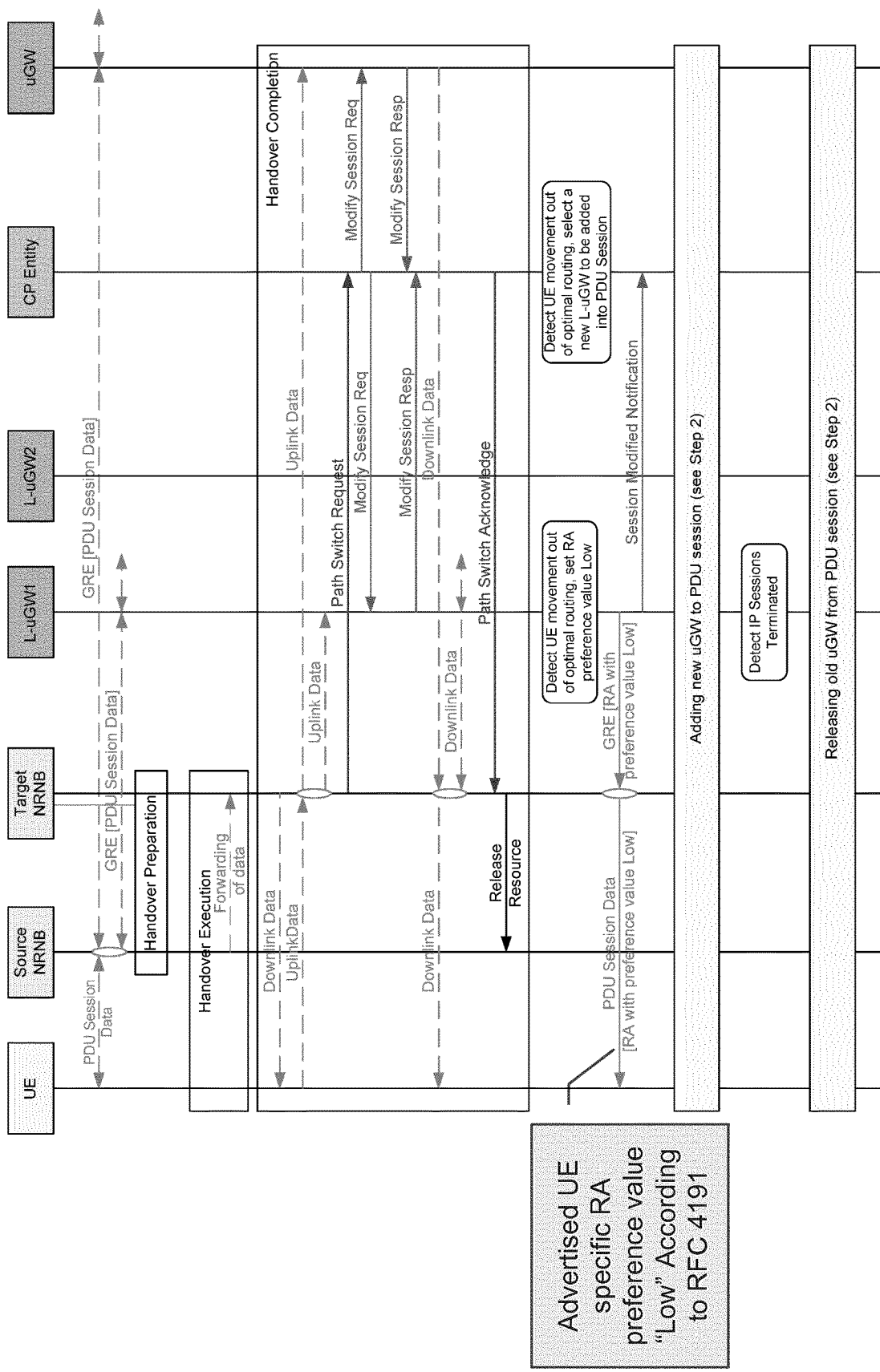
FIG. 14 shows a schematic diagram of an example of a system environment with signaling variants according to exemplary embodiments of the present invention.

FIG. 14 shows a schematic diagram of an example of a system environment with signaling variants according to exemplary embodiments of the present invention.

In particular, in relation to FIG. 14, exemplary embodiments of the present invention are described in more concrete terms.

Namely, in FIG. 14, an inter NRNB handover procedure with multiple uGWs (L-uGW1 and uGW) is illustrated, in which the network is switching multi-homed IPv6 connectivity via uGW (centralized) and an L-uGW1 (local) to a target NRNB which provides a non-optimal route from the L-uGW1 to the UE.

As can be seen in FIG. 14, according to exemplary embodiments of the present invention, in a mobility event (inter NRNB handover), an L-uGW1 detecting non-optimal route sends autonomously UE specific RA to a PDU session with preference value "Low" in order to direct UE in its newly established IP sessions to use the possible new L-uGW with better route on the data path. Subsequently, a notification message about a changed PDU session data may be sent to the control functions (CP entity) in order to keep the NG core network up-to-date.

Figure 15:
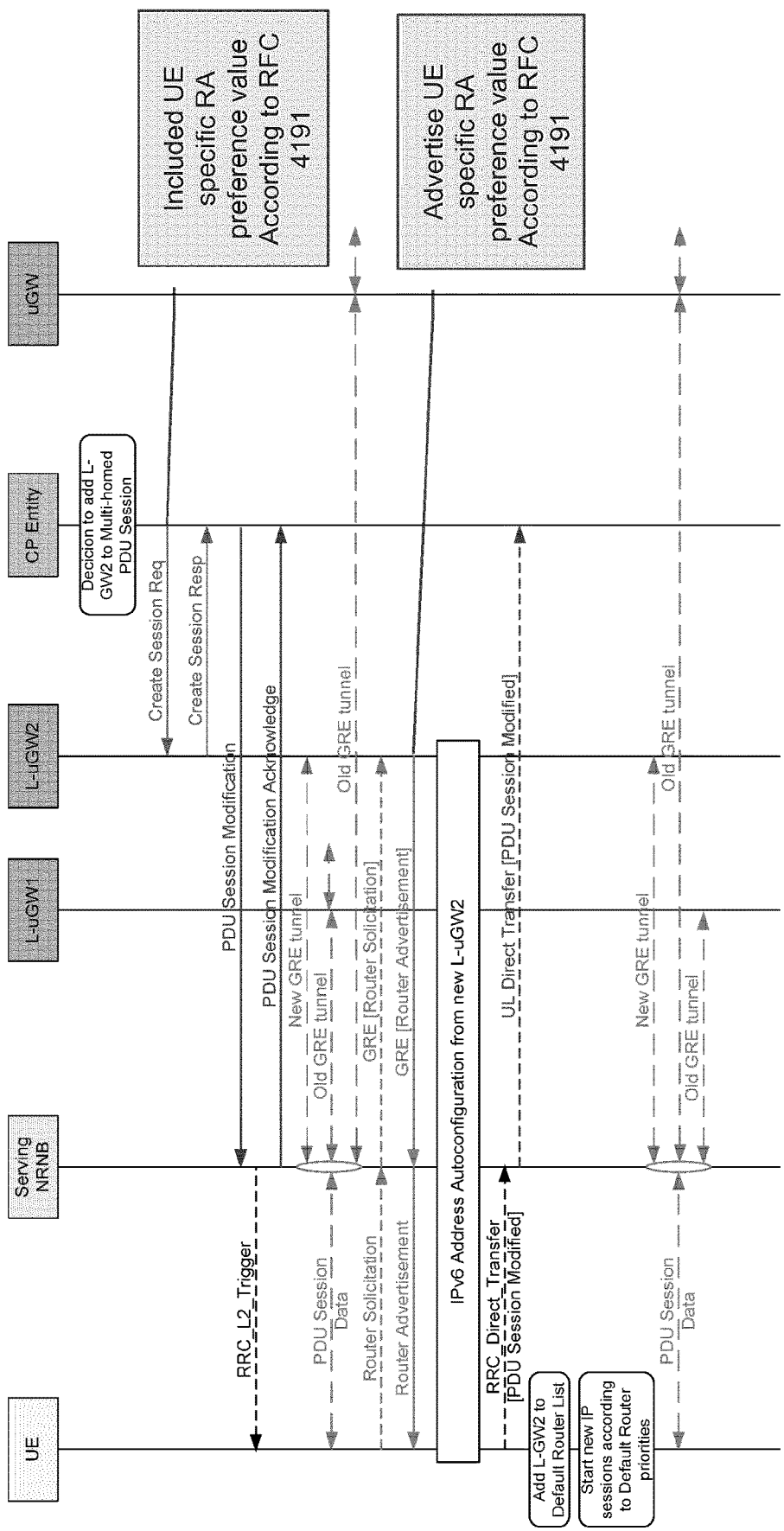
FIG. 15 shows a schematic diagram of an example of a system environment with signaling variants according to exemplary embodiments of the present invention.

Here, it is noted that the step "adding new uGW to PDU session" refers to the schematic diagram shown in FIG. 15. Further, the step "releasing old uGW from PDU session" refers to the schematic diagram shown in FIG. 16.

FIG. 15 shows a schematic diagram of an example of a system environment with signaling variants according to exemplary embodiments of the present invention.

In particular, in relation to FIG. 15, exemplary embodiments of the present invention are described in more concrete terms.

Namely, in FIG. 15, adding a new L-uGW2 with optimal-routing to a multi-homed PDU session e.g. after handover is illustrated.

As can be seen in FIG. 15, according to exemplary embodiments of the present invention, in a mobility event the newest L-uGW router that is connected to a UE after a handover is assumed to provide the most optimal route (see FIG. 12) for a multi-homed UE. As the network control functions (CP entity) are aware of the network topology and the preferred routes, in such mobility event the NG network control functions configure in the new L-uGW the RA preference value in its UE uGW context data to send a UE specific RAs to associated PDU Session with higher, or at least with the same preference value than what is advertised in the old L-uGW which is used for the current IP sessions at the application layer.

Figure 16:
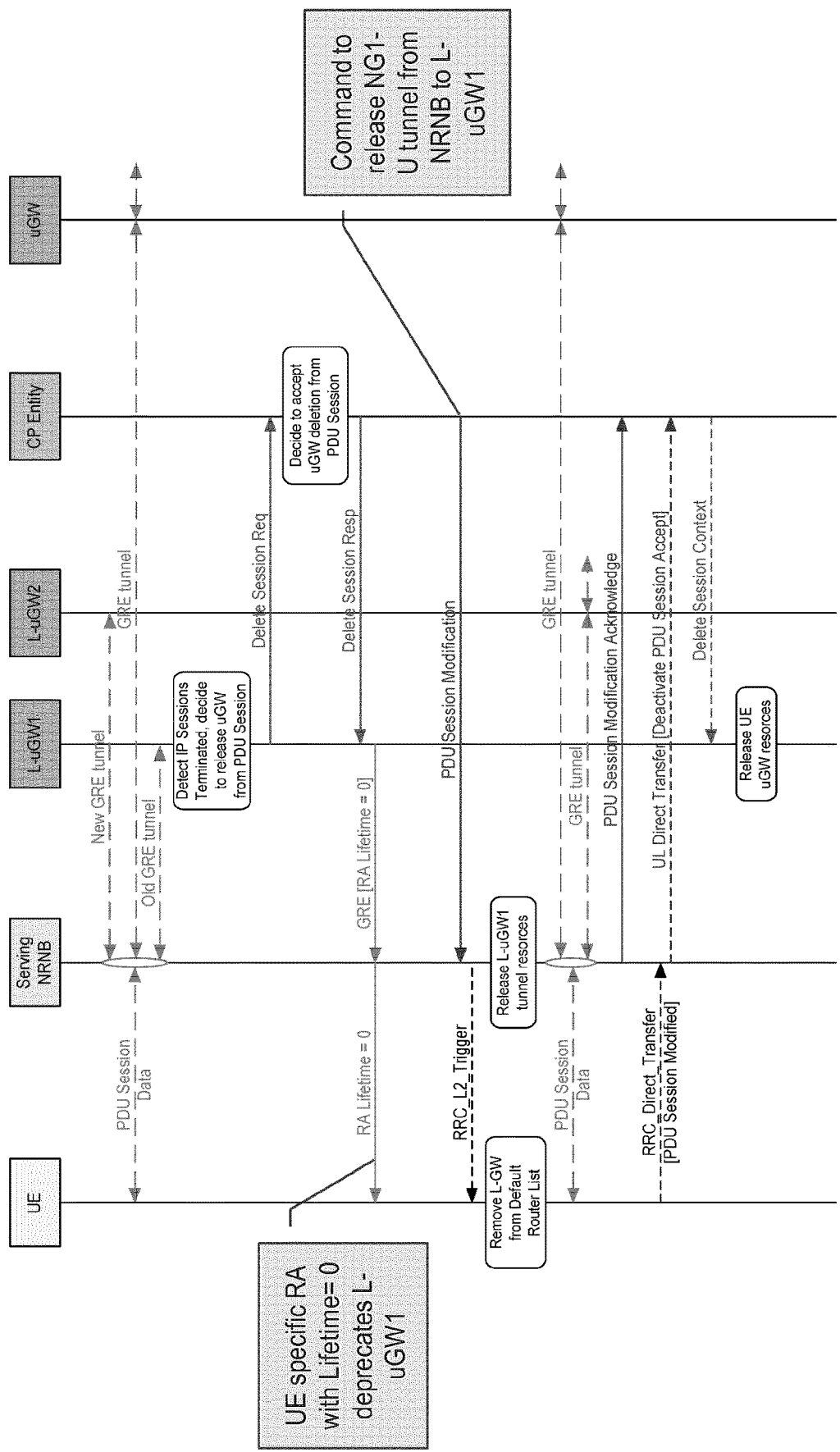
FIG. 16 shows a schematic diagram of an example of a system environment with signaling variants according to exemplary embodiments of the present invention.

FIG. 16 shows a schematic diagram of an example of a system environment with signaling variants according to exemplary embodiments of the present invention.

In particular, in relation to FIG. 16, exemplary embodiments of the present invention are described in more concrete terms.

Namely, in FIG. 16, releasing of an old L-uGW1 with non-optimal routing from a multi-homed PDU session e.g. after handover is illustrated.

As can be seen in FIG. 16, according to exemplary embodiments of the present invention, after a handover a UE with a multi-homed IPv6 connectivity eventually terminates its ongoing IP sessions using non-optimal old L-uGW1 which advertises "Low" preference value. Accordingly, according the exemplary embodiments, an uGW advertising low preference value monitors and detects when the(se) ongoing IP session(s) in a UE specific PDU session become(s) terminated. Upon such detection, L-uGW may send a "Delete PDU Session Request" message to the NG network control functions. When receiving a "Delete Session Response" message with "accept", the L-uGW sends to a UE specific PDU session RAs with router's lifetime set to zero. In this way the UE becomes deprecated in a managed manner from its IPv6 connectivity via a non-optimal L-uGW1.

According to the exemplary embodiments of the present invention, it is provided a highly dynamic NG network controlled approach to manage the default router and source address selection rules in the UE IP stack and the uGWs routers while a UE has a multi-homed IPv6 connectivity via multiple uGWs routers.

Further, the exemplary embodiments of the present invention may be operable with all UEs which have implemented a standard IPv6 protocol stack according to the IETF specifications (including RFC 4191).

Further, the exemplary embodiments of the present invention may be operable with tethered UEs having MT and TE (IP host) functions separated including a case in which a UE operates as a router to multiple IP hosts using the MT for mobile broadband access.

Further, the exemplary embodiments of the present invention are independent of the used link model i.e. operate both with the multiple PDU sessions and with the new multi-homed PDU session (IPv6) cases which may be supported in the NG networks.

Further, according to the exemplary embodiments of the present invention, the management (SM and MM) of a proposed multi-homed PDU session in the NG network is much simpler than using multiple PDU sessions for IPv6 multi-homed connectivity. Namely, the former requires remarkably less signaling messages on the NG C-plane.

Further, according to the exemplary embodiments of the present invention, the multi-homed PDU session in the NG network enables simpler implementation in the MT (NR radio specific) part of a UE.

Further, according to the exemplary embodiments of the present invention, the multi-homed PDU session in the NG network enables simple and efficient U-plane for accessing simultaneously local (e.g. MEC) and centralized services (e.g. IMS).

Finally, according to the exemplary embodiments of the present invention, the dynamically controllable default router preferences in the UE using IPv6 multi-homing enable provision of a seamless GW change (IP mobility with IP address preservation) in the NG networks.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 17:
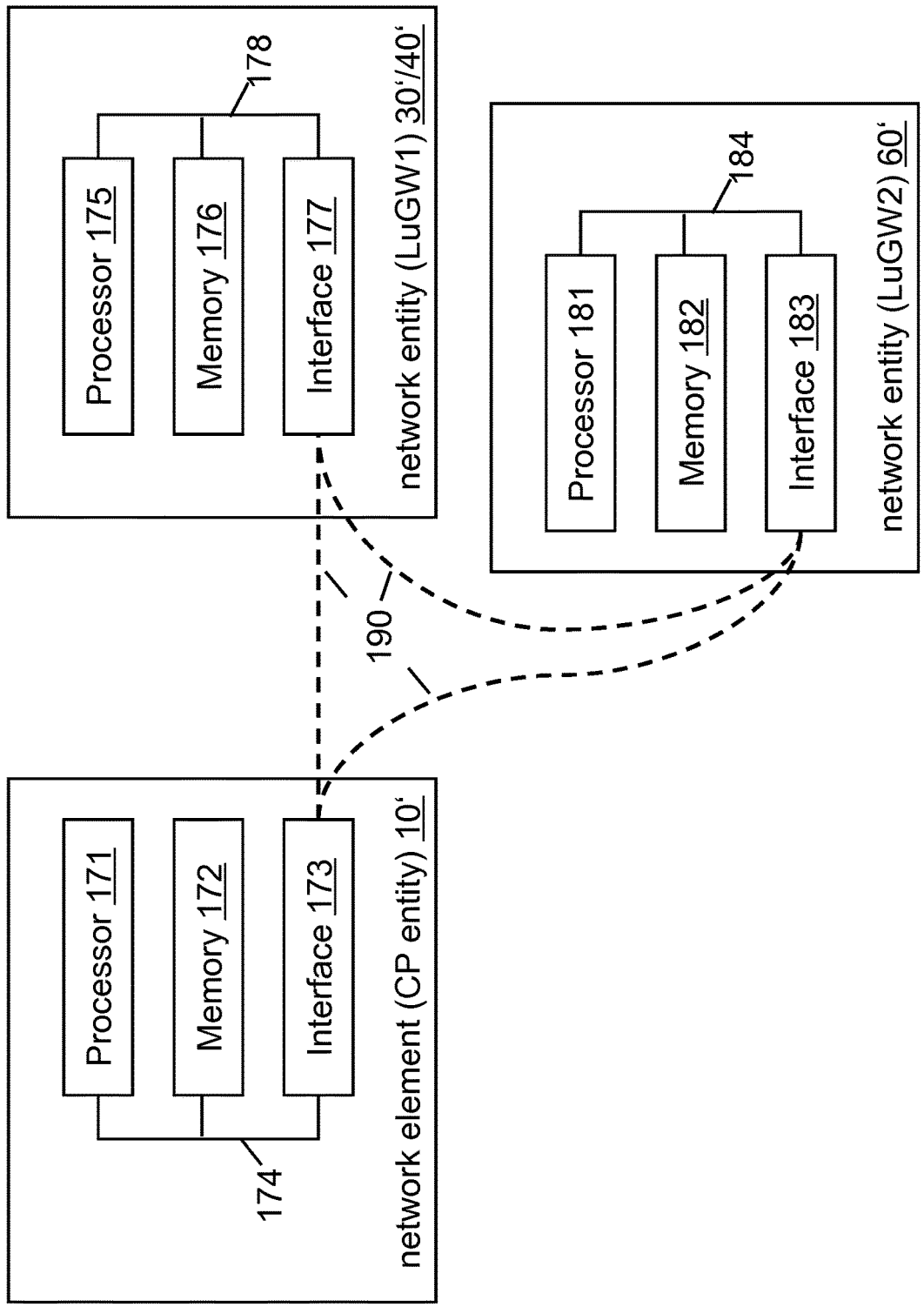
FIG. 17 is a block diagram alternatively illustrating apparatuses according to exemplary embodiments of the present invention.

In FIG. 17, an alternative illustration of apparatuses according to exemplary embodiments of the present invention is depicted. As indicated in FIG. 17, according to exemplary embodiments of the present invention, the apparatus (network entity) 10' (corresponding to the network entity 10) comprises a processor 171, a memory 172 and an interface 173, which are connected by a bus 174 or the like. Further, according to exemplary embodiments of the present invention, the apparatus (network entity) 30'/40' (corresponding to the network entity 30/40) comprises a processor 175, a memory 176 and an interface 177, which are connected by a bus 178 or the like. Further, according to exemplary embodiments of the present invention, the apparatus (network entity) 60' (corresponding to the network entity 60) comprises a processor 181, a memory 182 and an interface 183, which are connected by a bus 184 or the like, and the apparatuses may be connected via links 190, respectively.

The processor 171/175/181 and/or the interface 173/177/183 may also include a modem or the like to facilitate communication over a (hardwire or wireless) link, respectively. The interface 173/177/183 may include a suitable transceiver coupled to one or more antennas or communication means for (hardwire or wireless) communications with the linked or connected device(s), respectively. The interface 173/177/183 is generally configured to communicate with at least one other apparatus, i.e. the interface thereof.

The memory 172/176/182 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network entity 10 comprises at least one processor 171, at least one memory 172 including computer program code, and at least one interface 173 configured for communication with at least another apparatus. The processor (i.e. the at least one processor 171, with the at least one memory 172 and the computer program code) is configured to perform detecting movement of said access of said terminal from a first base station to a second base station (thus the apparatus comprising corresponding means for detecting), to perform determining that a first network route which is a current network route from said terminal via a first local gateway which is a current local gateway of said at least one local gateway provides less network performance than a second network route from said terminal via a second local gateway of said at least one local gateway based on a result of said detecting (thus the apparatus comprising corresponding means for determining), and to perform deciding said second local gateway as a target local gateway for said terminal based on a result of said determining (thus the apparatus comprising corresponding means for deciding).

According to exemplary embodiments of the present invention, an apparatus representing the network entity 30 comprises at least one processor 175, at least one memory 176 including computer program code, and at least one interface 177 configured for communication with at least another apparatus. The processor (i.e. the at least one processor 175, with the at least one memory 176 and the computer program code) is configured to perform receiving, if a second local gateway is decided as a target local gateway by a control plane network entity, information from said control plane network entity, said information being indicative of a new preference value related to a session between said first local gateway and said terminal which is lower than a current preference value related to said session between said first local gateway and said terminal (thus the apparatus comprising corresponding means for receiving), and to perform transmitting, to said terminal, a message including said new preference value (thus the apparatus comprising corresponding means for transmitting).

According to exemplary embodiments of the present invention, an apparatus representing the network entity 40 comprises at least one processor 175, at least one memory 176 including computer program code, and at least one interface 177 configured for communication with at least another apparatus. The processor (i.e. the at least one processor 175, with the at least one memory 176 and the computer program code) is configured to perform detecting movement of said access of said terminal from a first base station to a second base station (thus the apparatus comprising corresponding means for detecting), to perform determining that a first network route which is a current network route from said terminal via said first local gateway which is a current local gateway of said at least one local gateway provides less network performance than a second network route from said terminal via a second local gateway of said at least one local gateway based on a result of said detecting (thus the apparatus comprising corresponding means for determining), to perform deciding a new preference value related to a session between said first local gateway and said terminal which is lower than a current preference value related to said session between said first local gateway and said terminal (thus the apparatus comprising corresponding means for deciding), and to perform transmitting, to said terminal, a message including said new preference value (thus the apparatus comprising corresponding means for transmitting).

According to exemplary embodiments of the present invention, an apparatus representing the network entity 60 comprises at least one processor 181, at least one memory 182 including computer program code, and at least one interface 183 configured for communication with at least another apparatus. The processor (i.e. the at least one processor 181, with the at least one memory 182 and the computer program code) is configured to perform receiving, if said second local gateway is decided as a target local gateway by a control plane network entity, information from said control plane network entity, said information being indicative of a preference value related to a session between said second local gateway and said terminal which is equal to or higher than a preference value related to a session between said first local gateway and said terminal (thus the apparatus comprising corresponding means for receiving), and to perform transmitting, to said terminal, a message including said preference value related to said session between said second local gateway and said terminal (thus the apparatus comprising corresponding means for transmitting). For further details regarding the operability/functionality of the individual apparatuses, reference is made to the above description in connection with any one of FIGS. 1 to 16, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for assisted distributed gateway selection. Such measures exemplarily comprise (as control plane network entity functionality in a mobile network scenario where an access of a terminal to a network is movable between at least two base stations and routable in parallel via at least one local gateway and a centralized gateway) detecting movement of said access of said terminal from a first base station to a second base station, determining that a first network route which is a current network route from said terminal via a first local gateway which is a current local gateway of said at least one local gateway provides less network performance than a second network route from said terminal via a second local gateway of said at least one local gateway based on a result of said detecting, and deciding said second local gateway as a target local gateway for said terminal based on a result of said determining.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
APN access point name
C-plane control plane, CP
CN core network
DN data network
e-2-e end to end
edge DN edge data network
GPRS general packet radio service GTP GPRS tunneling protocol
GW gateway
IETF internet engineering task force
IMS IP multimedia subsystem
IP internet protocol
IPv6 internet protocol version 6
L-GW local GW
LIPA local IP access
LLA link layer address
LTE Long Term Evolution
MEC mobile edge computing
MM mobility management
NB NodeB
ND neighbor discovery in IPv6
NG next generation
NGNB NG node B
NR new radio
OS operating system
p-t-p point-to-point
PDN packet data network
PDU packet data unit
RA router advertisement
RAN radio access network
RRC radio resource control
SIPTO selected IP traffic offload
SM session management
U-plane user plane
UE user equipment
uGW user gateway
V×V vehicle-to-vehicle, V2V

The invention claimed is:

1. A method of a control plane network entity in a mobile network scenario where an access of a terminal to a network is movable between at least two base stations and routable in parallel via at least one local gateway and a centralized gateway, the method comprising:
    detecting movement of said access of said terminal from a first base station to a second base station,
    determining that a first network route which is a current network route from said terminal via a first local gateway which is a current local gateway of said at least one local gateway provides less network performance than a second network route from said terminal via a second local gateway of said at least one local gateway based on a result of said detecting,
    deciding said second local gateway as a target local gateway for said terminal based on a result of said determining, wherein the second network route is to be added prior to release of the first network route to maintain parallel access by the terminal to a local service via the at least one local gateway and to the centralized gateway, and
    transmitting, if said second local gateway is decided as said target local gateway, information to said first local gateway, said information being indicative of a new preference value related to a session between said first local gateway and said terminal which is lower than a current preference value related to said session between said first local gateway and said terminal.

2. The method according to claim 1, further comprising:
    transmitting, if said second local gateway is decided as said target local gateway, information to said second local gateway, said information being indicative of a preference value related to a session between said second local gateway and said terminal which is equal to or higher than a preference value related to a session between said first local gateway and said terminal.

3. The method according to claim 1, wherein said determining is based on a network topology with respect to said at least two base stations and said at least one local gateway.

4. The method according to claim 1, further comprising:
    receiving, from said first local gateway, a message indicative of a request regarding a removal of said first network route from said terminal, and
    transmitting, to said first local gateway, a message indicative of acceptance regarding said removal of said first network route from said terminal.

5. A computer program product embodied on a non-transitory computer-readable medium, said product comprising computer-executable computer program code which, when the program is run on a computer, is configured to cause the computer to carry out the method according to claim 1.

6. A method in a mobile network scenario where an access of a terminal to a network is movable between at least two base stations and routable in parallel via at least one local gateway and a centralized gateway, the method of a first local gateway of said at least one local gateway comprising:
    receiving, if a second local gateway is decided as a target local gateway by a control plane network entity, information from said control plane network entity, said information being indicative of a new preference value related to a session between said first local gateway and said terminal which is lower than a current preference value related to said session between said first local gateway and said terminal, wherein the second local gateway is to be added prior to release of the first local gateway to maintain parallel access by the terminal to a local service via the at least one local gateway and to the centralized gateway, and
    transmitting, to said terminal, a message including said new preference value.

7. The method according to claim 6, further comprising:
    monitoring said session between said first local gateway and said terminal for termination thereof, and
    transmitting, upon detection of termination of said session between said first local gateway and said terminal as a result of said monitoring, to said control plane network entity, a message indicative of a request regarding a removal of said first network route from said terminal.

8. An apparatus providing control plane network entity functionality in a mobile network scenario where an access of a terminal to a network is movable between at least two base stations and routable in parallel via at least one local gateway and a centralized gateway, the apparatus comprising:
    at least one processor,
    at least one memory including computer program code, and
    at least one interface configured for communication with at least another apparatus,
    the at least one processor, with the at least one memory and the computer program code, being configured to cause the apparatus to perform:
        detecting movement of said access of said terminal from a first base station to a second base station,
        determining that a first network route which is a current network route from said terminal via a first local gateway which is a current local gateway of said at least one local gateway provides less network performance than a second network route from said terminal via a second local gateway of said at least one local gateway based on a result of said detecting, deciding said second local gateway as a target local gateway for said terminal based on a result of said determining, wherein the second network route is to be added prior to release of the first network route to maintain parallel access by the terminal to a local service via the at least one local gateway and to the centralized gateway, and transmitting, if said second local gateway is decided as said target local gateway, information to said first local gateway, said information being indicative of a new preference value related to a session between said first local gateway and said terminal which is lower than a current preference value related to said session between said first local gateway and said terminal.

9. The apparatus according to claim 8, wherein
the at least one processor, with the at least one memory and the computer program code, being configured to cause the apparatus to perform:
transmitting, if said second local gateway is decided as said target local gateway, information to said second local gateway, said information being indicative of a preference value related to a session between said second local gateway and said terminal which is equal to or higher than a preference value related to a session between said first local gateway and said terminal.

10. The apparatus according to claim 8, wherein
said determining is based on a network topology with respect to said at least two base stations and said at least one local gateway.

11. The apparatus according to claim 8, wherein
the at least one processor, with the at least one memory and the computer program code, being configured to cause the apparatus to perform:
receiving, from said first local gateway, a message indicative of a request regarding a removal of said first network route from said terminal, and
transmitting, to said first local gateway, a message indicative of acceptance regarding said removal of said first network route from said terminal.

12. An apparatus providing first local gateway functionality in a mobile network scenario where an access of a terminal to a network is movable between at least two base stations and routable in parallel via at least one local gateway and a centralized gateway, the apparatus comprising:
at least one processor,
at least one memory including computer program code, and
at least one interface configured for communication with at least another apparatus,
the at least one processor, with the at least one memory and the computer program code, being configured to cause the apparatus to perform:
receiving, if a second local gateway is decided as a target local gateway by a control plane network entity, information from said control plane network entity, said information being indicative of a new preference value related to a session between said first local gateway and said terminal which is lower than a current preference value related to said session between said first local gateway and said terminal, wherein the second local gateway is to be added prior to release of the first local gateway to maintain parallel access by the terminal to a local service via the at least one local gateway and to the centralized gateway, and
transmitting, to said terminal, a message including said new preference value.

13. The apparatus according to claim 12, wherein
the at least one processor, with the at least one memory and the computer program code, being configured to cause the apparatus to perform:
monitoring said session between said first local gateway and said terminal for termination thereof, and
transmitting, upon detection of termination of said session between said first local gateway and said terminal as a result of said monitoring, to said control plane network entity, a message indicative of a request regarding a removal of said first network route from said terminal.

14. The apparatus according to claim 13, wherein
the at least one processor, with the at least one memory and the computer program code, being configured to cause the apparatus to perform:
receiving, from said control plane network entity, a message indicative of acceptance regarding said removal of said first network route from said terminal, and
transmitting, to said terminal, a message indicative of a lifetime of said first local gateway set to Zero, and
wherein optionally
said message indicative of said lifetime comprises a terminal local gateway context data router advertisement.

15. An apparatus providing first local gateway functionality in a mobile network scenario where an access of a terminal to a network is movable between at least two base stations and routable in parallel via at least one local gateway and a centralized gateway, the apparatus comprising:
at least one processor,
at least one memory including computer program code, and
at least one interface configured for communication with at least another apparatus,
the at least one processor, with the at least one memory and the computer program code, being configured to cause the apparatus to perform:
detecting movement of said access of said terminal from a first base station to a second base station,
determining that a first network route which is a current network route from said terminal via said first local gateway which is a current local gateway of said at least one local gateway provides less network performance than a second network route from said terminal via a second local gateway of said at least one local gateway based on a result of said detecting,
deciding a new preference value related to a session between said first local gateway and said terminal which is lower than a current preference value related to said session between said first local gateway and said terminal, wherein the second network route is to be added prior to release of the first network route to maintain parallel access by the terminal to a local service via the at least one local gateway and to the centralized gateway, and
transmitting, to said terminal, a message including said new preference value.

16. The apparatus according to claim 15, wherein
said determining is based on a network topology with respect to said at least two base stations and said at least one local gateway.

17. An apparatus in a mobile network scenario where an access of a terminal to a network is movable between at least two base stations and routable in parallel via at least one local gateway and a centralized gateway, wherein, when a current local gateway is a first local gateway of said at least one local gateway, the apparatus providing second local gateway functionality comprising:

at least one processor, at least one memory including computer program code, and at least one interface configured for communication with at least another apparatus, the at least one processor, with the at least one memory and the computer program code, being configured to cause the apparatus to perform:

receiving, if said second local gateway is decided as a target local gateway by a control plane network entity, information from said control plane network entity, said information being indicative of a preference value related to a session between said second local gateway and said terminal which is equal to or higher than a preference value related to a session between said first local gateway and said terminal, wherein the second local gateway is to be added prior to release of the first local gateway to maintain parallel access by the terminal to a local service via the at least one local gateway and to the centralized gateway, and transmitting, to said terminal, a message including said preference value related to said session between said second local gateway and said terminal.

\* \* \* \* \*